US012410015B2

(12) United States Patent
McCall et al.

(10) Patent No.: US 12,410,015 B2
(45) Date of Patent: *Sep. 9, 2025

(54) SOLAR MODULE CARRIERS AND RELATED SYSTEMS

(71) Applicant: Fluke Corporation, Everett, WA (US)

(72) Inventors: Mark Spurgeon McCall, Santa Rosa, CA (US); Willard MacDonald, Sebastopol, CA (US); Kunio Hasebe, Santa Rosa, CA (US); Roger L. Jungerman, Petaluma, CA (US)

(73) Assignee: Fluke Corporation, Everett, WA (US)

( * ) Notice: Subject to any disclaimer, the term of this patent is extended or adjusted under 35 U.S.C. 154(b) by 404 days.

This patent is subject to a terminal disclaimer.

(21) Appl. No.: 17/655,266

(22) Filed: Mar. 17, 2022

(65) Prior Publication Data

US 2022/0204272 A1 Jun. 30, 2022

Related U.S. Application Data

(63) Continuation-in-part of application No. 15/004,265, filed on Jan. 22, 2016, now Pat. No. 11,286,114.

(60) Provisional application No. 62/106,850, filed on Jan. 23, 2015.

(51) Int. Cl.
  *B65G 7/12* (2006.01)
  *A45F 5/10* (2006.01)
  *B65G 49/06* (2006.01)

(52) U.S. Cl.
  CPC ............... *B65G 7/12* (2013.01); *A45F 5/102* (2013.01); *B65G 49/061* (2013.01); *B65G 2201/022* (2013.01)

(58) Field of Classification Search
  CPC ................. B65G 7/12; A45F 3/10; A45F 5/10
  USPC ......................................................... 224/259
  See application file for complete search history.

(56) References Cited

U.S. PATENT DOCUMENTS

| 1,082,446 | A | * | 12/1913 | Rodman | B65G 7/12 |
| | | | | | 294/26 |
| 1,251,278 | A | * | 12/1917 | Porter | B65G 7/12 |
| | | | | | 16/DIG. 15 |
| 2,430,142 | A | | 11/1947 | Roberts | |
| 2,651,441 | A | * | 9/1953 | Rau | A45F 3/14 |
| | | | | | 224/264 |
| 2,776,856 | A | * | 1/1957 | Ingram | A45F 5/10 |
| | | | | | 294/16 |
| 3,336,068 | A | * | 8/1967 | Renfroe | E04G 21/16 |
| | | | | | 294/101 |
| 3,374,024 | A | * | 3/1968 | Reynolds | B65G 49/061 |
| | | | | | 294/16 |

(Continued)

FOREIGN PATENT DOCUMENTS

DE 0334920 C 3/1921
DE 20 2005 018 592 U1 * 4/2006 ............... B65G 7/12

(Continued)

*Primary Examiner* — Nathan J Newhouse
*Assistant Examiner* — Lester L Vanterpool
(74) *Attorney, Agent, or Firm* — Merchant & Gould P.C.

(57) ABSTRACT

The present disclosure is directed to carrier device, and related systems. A device may include a handle and at least one attachment device coupled to the handle. The at least one attachment device may be configured to couple to a solar module, wherein each attachment device includes at least one of a channel for receiving a portion of a frame of the solar module.

19 Claims, 30 Drawing Sheets

(56) References Cited

U.S. PATENT DOCUMENTS

| | | | |
|---|---|---|---|
| 3,524,670 A * | 8/1970 | Ilich | B65G 7/12 294/142 |
| 4,013,202 A * | 3/1977 | Russo | B65G 7/12 294/169 |
| 4,098,442 A | 7/1978 | Moore | |
| 4,113,160 A | 9/1978 | Spiers | |
| 4,135,655 A | 1/1979 | Brown | |
| 4,177,911 A | 12/1979 | Griffin | |
| 4,190,278 A | 2/1980 | Frank, Jr. | |
| 4,463,977 A | 8/1984 | Wyatt | |
| 4,483,380 A | 11/1984 | Beran | |
| 4,630,838 A | 12/1986 | Stockton | |
| 4,993,953 A * | 2/1991 | Stein | G09F 15/00 434/367 |
| 5,226,688 A | 7/1993 | Russo et al. | |
| 5,226,888 A * | 7/1993 | Arney | A61M 25/1002 604/509 |
| 5,257,843 A * | 11/1993 | Nunn | B65G 7/12 294/902 |
| 5,397,158 A * | 3/1995 | Brass | B65G 7/12 294/26 |
| 6,113,167 A | 9/2000 | Mattis et al. | |
| 6,220,638 B1 * | 4/2001 | Carroll | B65G 7/12 294/102.1 |
| 6,412,838 B1 * | 7/2002 | Malamud | B65G 7/12 294/15 |
| 6,494,513 B2 * | 12/2002 | Worthington | B65G 7/12 294/92 |
| 6,857,673 B2 | 2/2005 | Lang | |
| 8,087,633 B2 * | 1/2012 | Vargo | B44D 3/18 248/441.1 |
| 9,114,932 B1 | 8/2015 | Majni | |
| 9,675,166 B2 * | 6/2017 | Mick | A45F 5/102 |
| D812,905 S | 3/2018 | Olsen et al. | |
| 2002/0148866 A1 | 10/2002 | Dent | |
| 2003/0122389 A1 | 7/2003 | Urbanovic | |
| 2003/0132641 A1 | 7/2003 | Ponec et al. | |
| 2004/0178240 A1 | 9/2004 | Bauer | |
| 2007/0046047 A1 | 3/2007 | Ehrhardt | |
| 2008/0057804 A1 | 3/2008 | Watanabe | |
| 2008/0185409 A1 | 8/2008 | Kellenberger | |
| 2009/0230707 A1 | 9/2009 | Scherger | |
| 2009/0321481 A1 | 12/2009 | Licausi | |
| 2010/0019114 A1 * | 1/2010 | Vargo | B44D 3/18 16/422 |
| 2010/0096420 A1 | 4/2010 | Holmer | |
| 2010/0187274 A1 * | 7/2010 | Chock, Jr. | B63B 32/87 294/142 |
| 2011/0241366 A1 | 10/2011 | Hamblin et al. | |
| 2012/0181762 A1 | 7/2012 | Skijus et al. | |
| 2014/0360951 A1 | 12/2014 | Werner | |

FOREIGN PATENT DOCUMENTS

| | | | | |
|---|---|---|---|---|
| DE | 334290 C | * | 9/2019 | B65G 7/12 |
| WO | WO-2007034565 A1 | * | 3/2007 | B65G 7/12 |

* cited by examiner

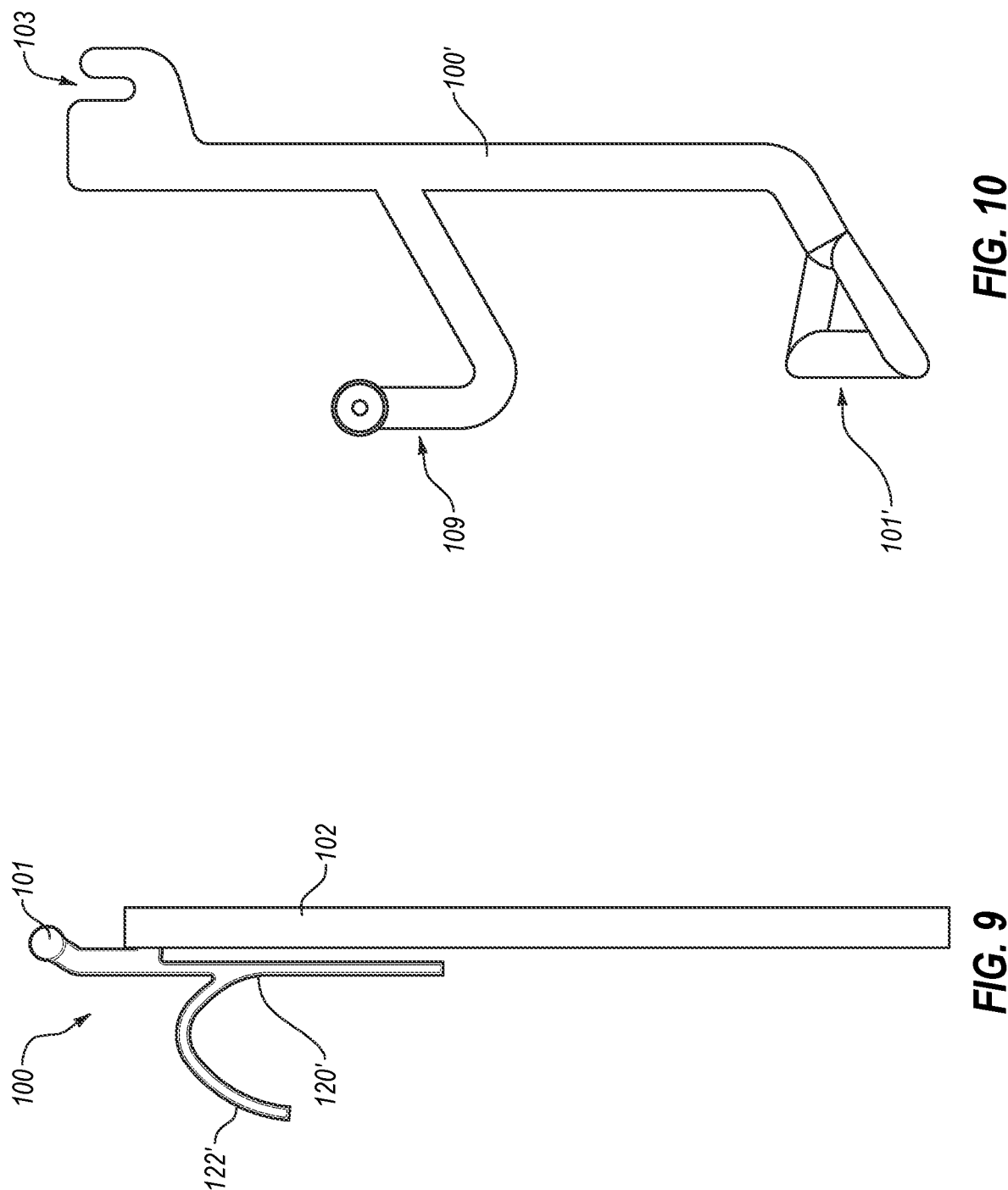

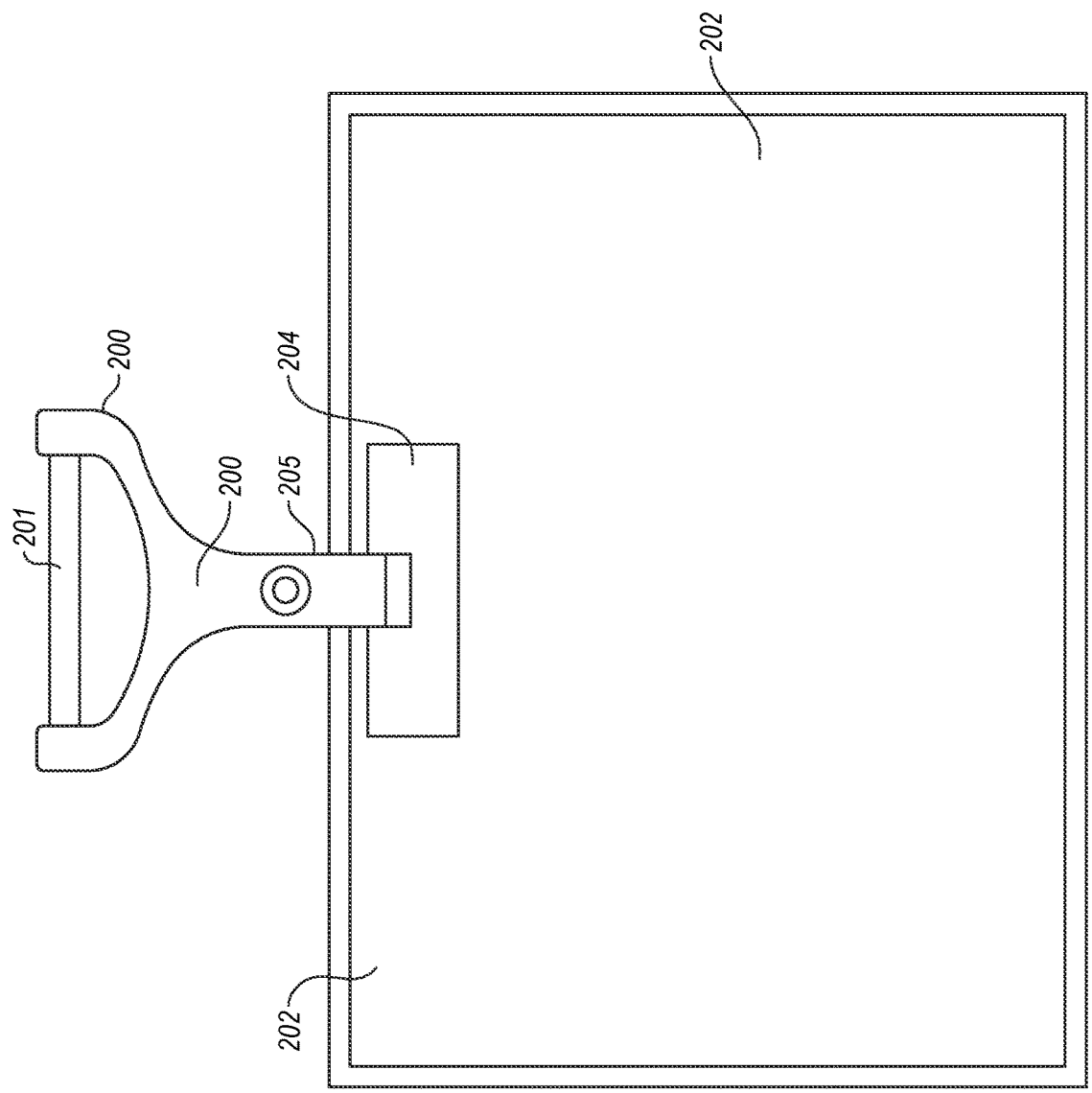

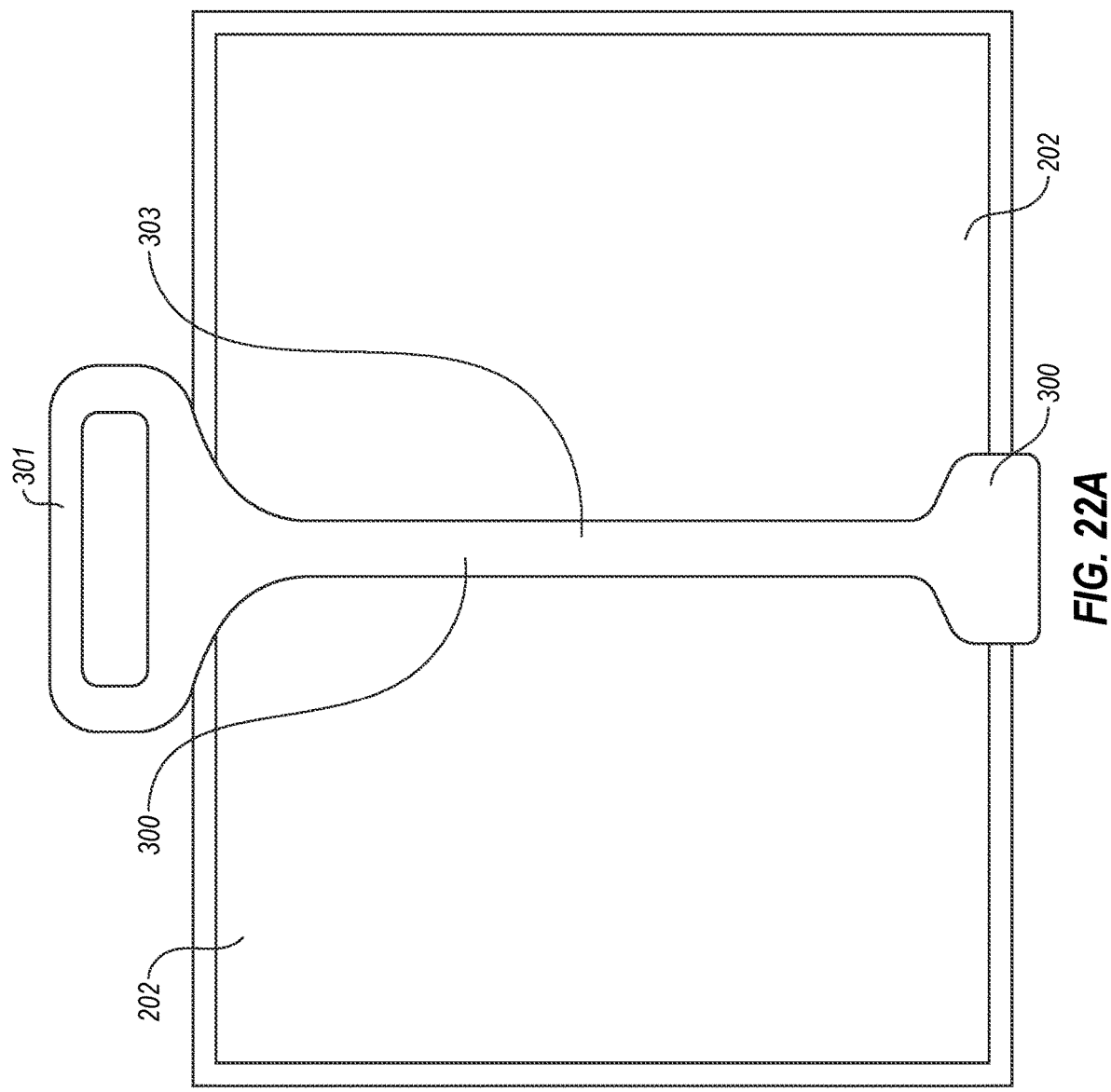

SOLAR MODULE CARRIERS AND RELATED SYSTEMS

CROSS-REFERENCE TO RELATED APPLICATIONS

This application is a continuation-in-part of U.S. patent application Ser. No. 15/004,265, filed Jan. 22, 2016, which claims the benefit of and priority to U.S. Provisional Patent Application No. 62/106,850, filed Jan. 23, 2015, which is incorporated herein by reference.

TECHNICAL FIELD

This disclosure relates generally to carrier devices and, more specifically, to carrier devices for carrying at least one solar module.

BRIEF SUMMARY

In one specific embodiment, a device includes a handle and at least one attachment device coupled to the handle. The at least one attachment device may include a channel configured for receiving a portion of a frame of a solar module. Further, in one embodiment, each attachment device may include an anti-slip device configured to limit movement of the solar module engaged with the attachment device. In addition, each attachment device may include an engagement device configured to be displaced by the portion of the frame upon the frame being positioned within the channel. The engagement device may be configured to provide a feedback (e.g., audible and/or tactical) upon the frame being engaged with the attachment device.

In another specific embodiment, a device includes a handle and at least one attachment device coupled to the handle and configured to couple to a solar module. Each attachment device includes a channel for receiving a frame of the solar module. Each attachment device may also include an anti-slip device proximate the channel and configured to limit movement of the frame positioned in the channel in a first direction, a second, opposite direction, or both. Moreover, the device may include a harness having at least one strap configured for securing the harness to a user. The harness may also include a latching device configured for attaching to at least one of the handle and the at least one attachment device. The harness may further include a wind force abatement device, which allows the module to align itself in such a way to reduce the force of the wind acting on the user via the harness.

According to another embodiment, a system includes a solar module and a carrier device configured to removably couple to the solar module. The carrier device may include a handle and at least one attachment device coupled to the handle and configured to couple to the solar module. Each attachment device may include at least one of a channel for receiving at least a portion of the solar module and a clamp for securing the solar module.

Other aspects, as well as features and advantages of various aspects, of the present disclosure will become apparent to those of skill in the art through consideration of the ensuing description, the accompanying drawings and the appended claims.

BRIEF DESCRIPTION OF THE DRAWINGS

FIG. 9 is a side-view illustration of a solar module coupled to a carrier device including a securing apparatus, according to an embodiment of the present disclosure.

FIGS. 10 and 11 illustrate a carrier device, according to an embodiment of the present disclosure.

FIGS. 21A and 21B illustrate a carrier device, according to an embodiment of the present disclosure.

FIGS. 22A and 22B depict another carrier device, in accordance with an embodiment of the present disclosure.

DETAILED DESCRIPTION

Figure 1A:
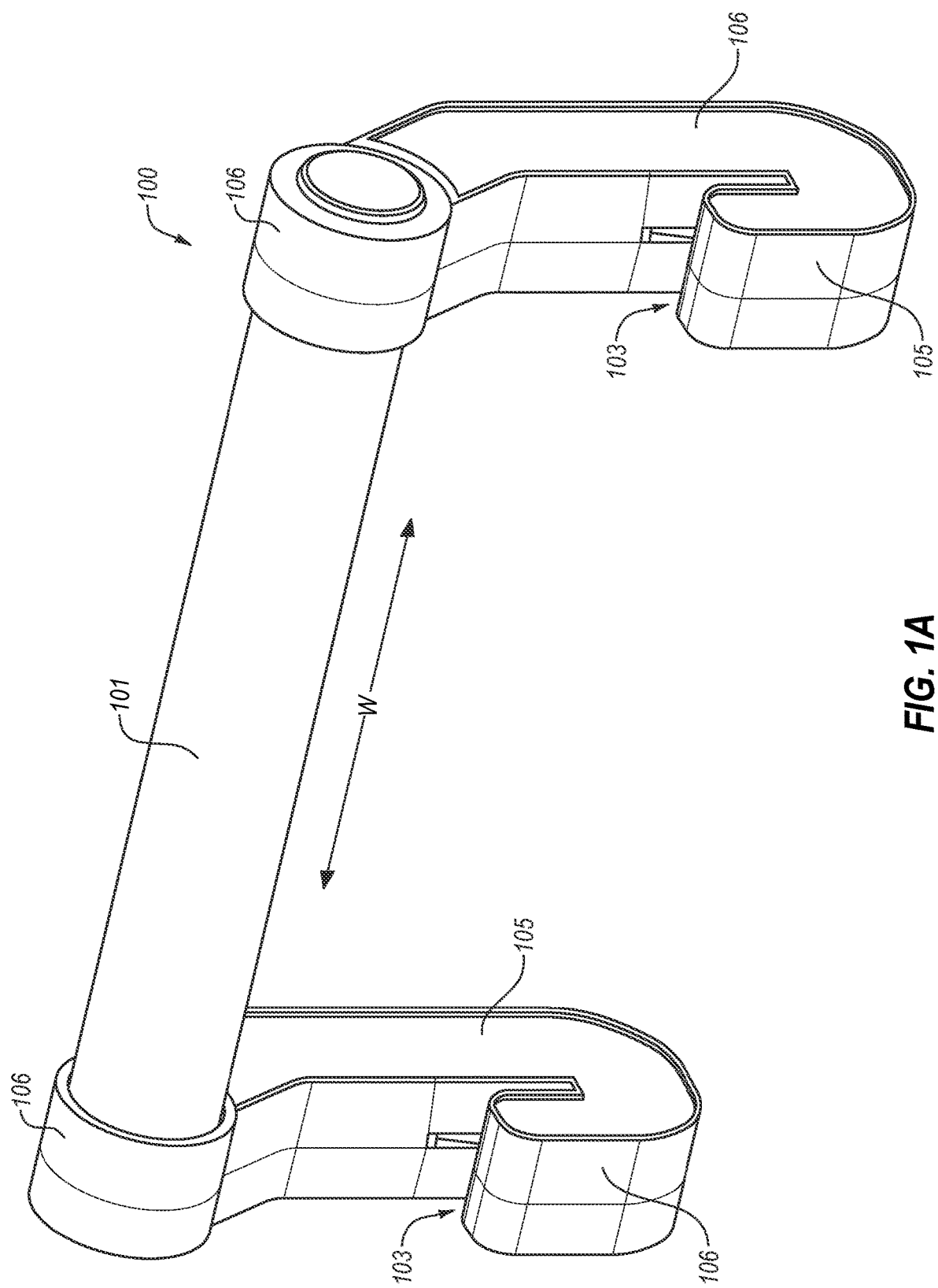
FIGS. 1A-1F are various illustrations of carrier device including a handle and attachment devices, in accordance with an embodiment of the present disclosure.
Figure 1B:
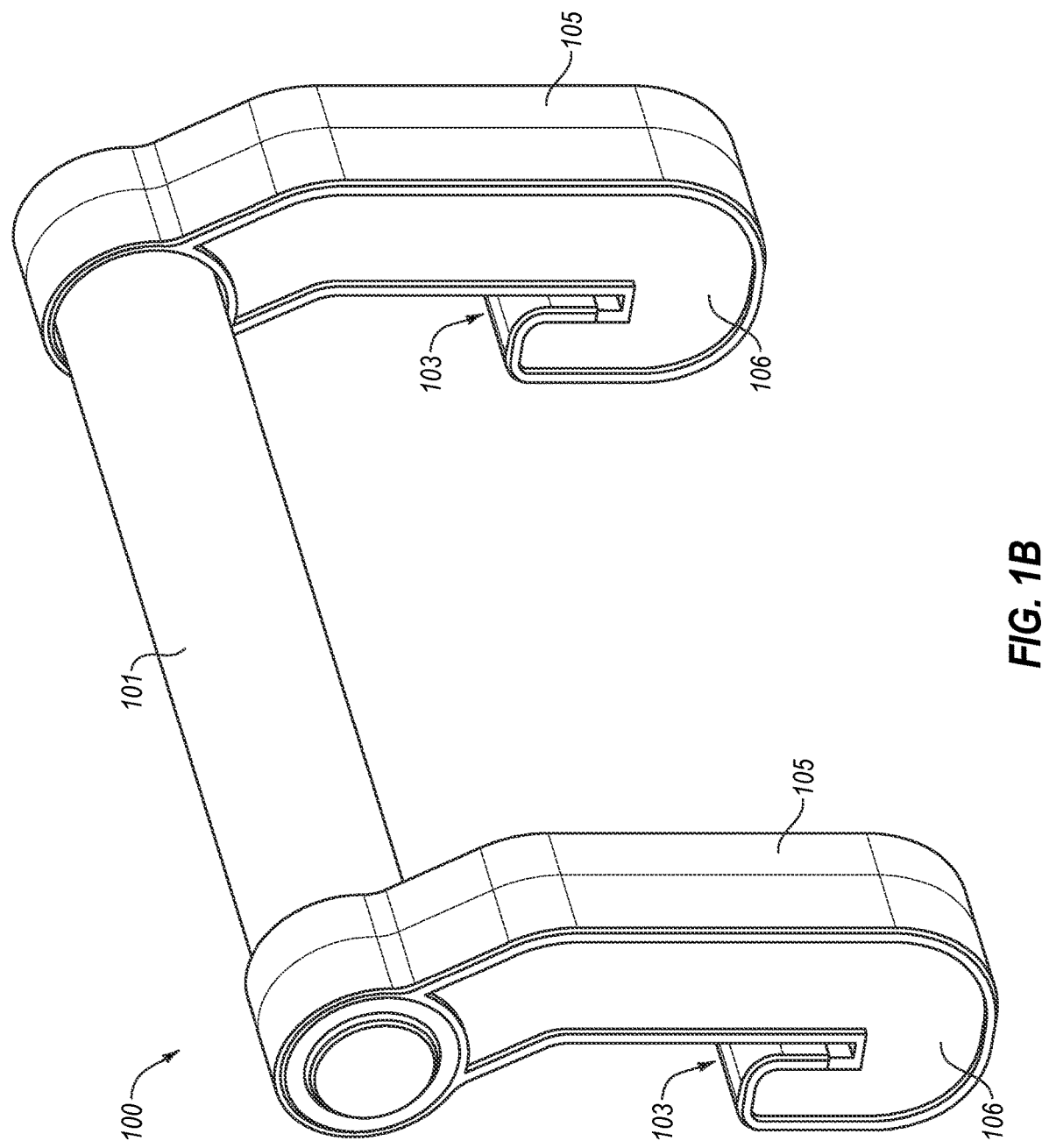
Figure 1C:
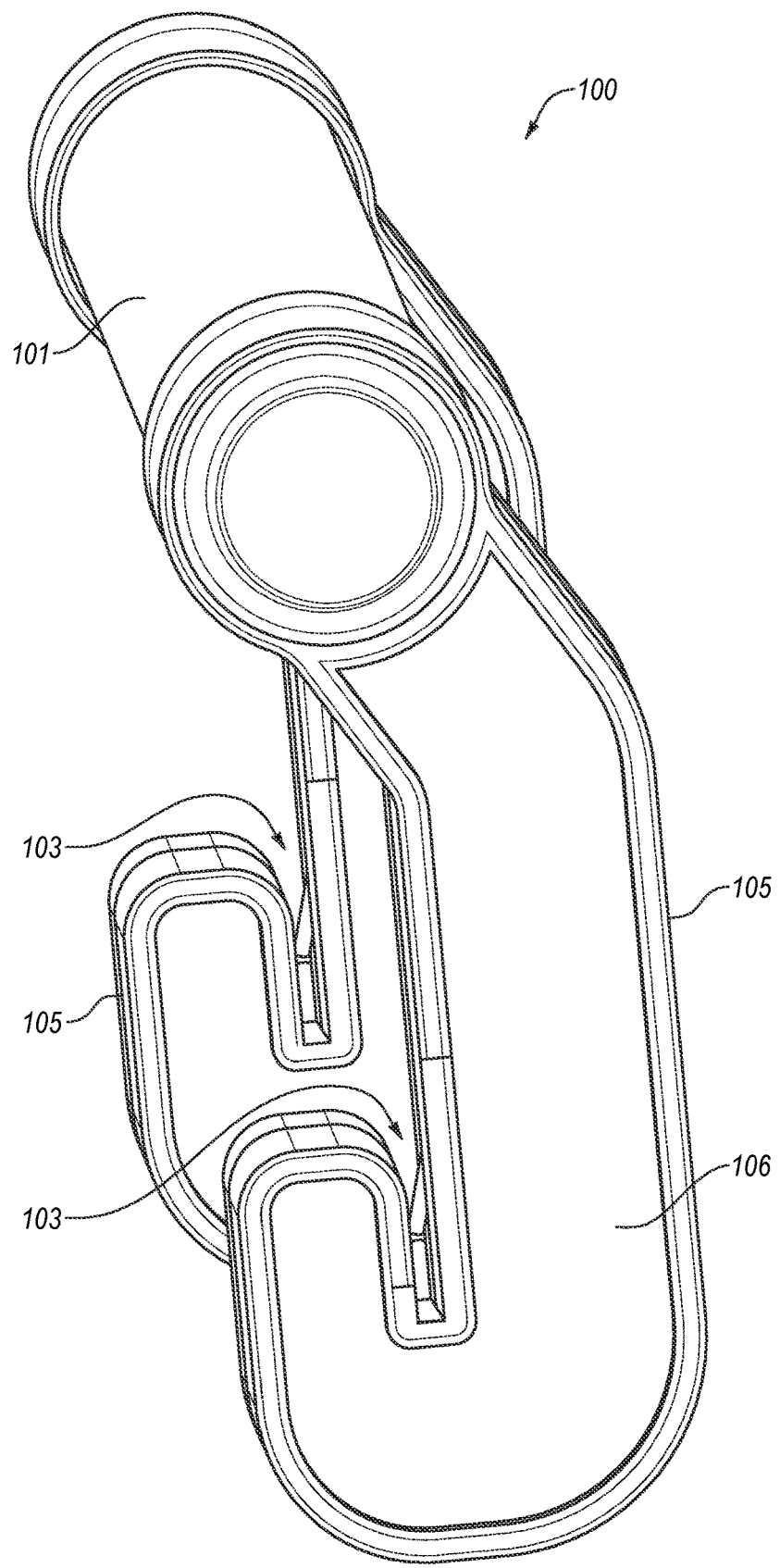
Figure 1D:
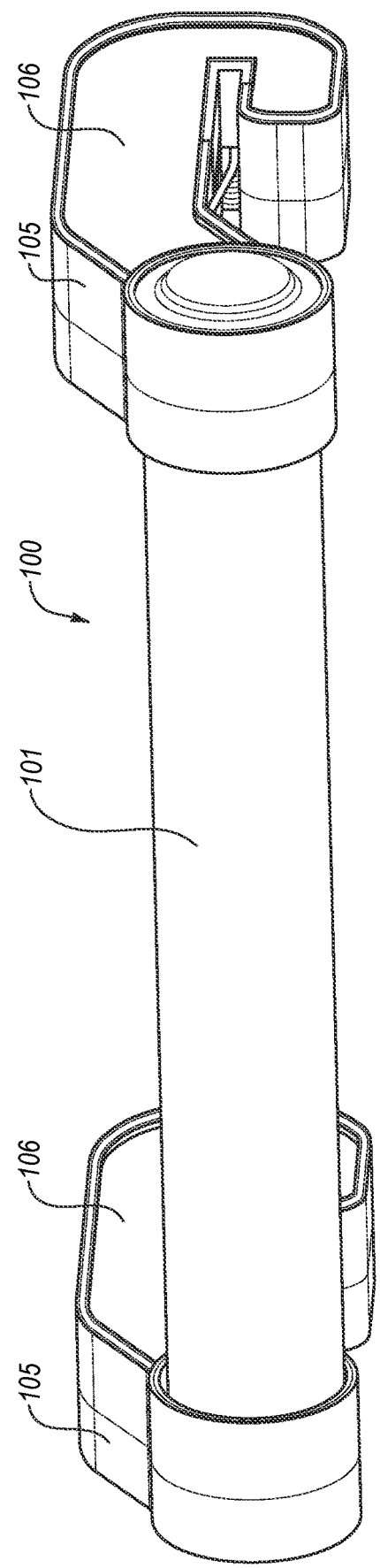

Referring in general to the accompanying drawings, various embodiments of the present disclosure are illustrated to show the structure for a carrier device. Common elements of the illustrated embodiments are designated with like numerals. It should be understood that the figures presented are not meant to be illustrative of actual views of any particular portion of the actual device structure, but are merely schematic representations which are employed to more clearly and fully depict embodiments of the disclosure.

The following provides a more detailed description of the present disclosure and various representative embodiments thereof. In this description, functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

As used herein, the term "substantially" in reference to a given parameter means and includes to a degree that one skilled in the art would understand that the given parameter, property, or condition is met with a small degree of variance, such as within acceptable manufacturing tolerances. By way of example, depending on the particular parameter, property, or condition that is substantially met, the parameter, property, or condition may be at least 90.0 percent met, at least 95.0 percent met, at least 99.0 percent met, at least 99.9 percent met, or even 100.0 percent met.

As used herein, "about," "substantially," or "approximately" in reference to a numerical value for a particular parameter is inclusive of the numerical value and a degree of variance from the numerical value that one of ordinary skill in the art would understand is within acceptable tolerances for the particular parameter. For example, "about," "substantially," or "approximately" in reference to a numerical value may include additional numerical values within a range of from 90.0 percent to 110.0 percent of the numerical value, such as within a range of from 95.0 percent to 105.0 percent of the numerical value, within a range of from 97.5 percent to 102.5 percent of the numerical value, within a range of from 99.0 percent to 101.0 percent of the numerical value, within a range of from 99.5 percent to 100.5 percent of the numerical value, or within a range of from 99.9 percent to 100.1 percent of the numerical value.

Solar photovoltaic (PV) cells use light energy (photons) from the sun to generate electricity through a photovoltaic effect. A PV solar module includes PV cells mounted behind glass and typically includes a frame at least partially surrounding the edges of the cells and glass. A PV system, which may include a plurality of solar modules and various other electrical components, may be used to generate and supply electricity in utility, commercial and residential applications. The soft-costs of installing a PV system (i.e., costs excluding the cost of the modules, inverters, and other equipment) can be more than half of the entire installation cost (e.g., more than 65% of the total cost of the installation). A large portion of the soft-costs is labor costs, including the cost of injury and accidents and workman's compensation insurance. Solar modules may also be of the type that converts energy from the sun into heat that is captured in a fluid running through collectors mounted behind glass. The heated fluid may then be used, for example, to heat water for use in a home, a pool, or a business. A solar hot water module typically includes a frame at least partially surrounding the edges of the glass and collectors. The labor required in a solar hot water installation is also a significant portion of the cost of a solar hot water system.

Solar installation companies are seeking ways to reduce labor costs. One aspect of installation labor is moving solar modules (e.g., lifting and carrying many modules from a truck to the mounting site). Moving solar modules is a physically tiring process and may require physically strong personnel. For example, a typical residential solar PV installation has around 18 solar modules and, typically, each solar module is approximately 1×1.6 meters in dimensions and approximately 42 pounds in weight. Solar modules are typically carried up a ladder and attached to a roof of a house, which is typically 5 to 8 meters tall. This can put significant strain on a person, who must simultaneously support the awkward shaped and heavy solar module during transportation, especially while ascending a ladder. Further, solar modules may have a sharp edge that is, for example, 1.5-2.5 mm thick and can cut into a hand of the person carrying the solar module. A solar module is often hefted over a person's shoulder and may contact the back of the person carrying the solar module. Accidents may occur as a consequence of fatigue or loss of balance. The Occupational Safety and Health Administration ("OSHA") requires maintaining three points of contact when climbing a ladder. This presents a challenge when personnel must climb a ladder while carrying a module. Some installation companies today may not be in compliance with the OSHA requirements. Further, pulley systems and/or dedicated solar module lifters require significant time to set-up and add significant cost to the installation process and, thus, are not practical for residential installations.

Various embodiments of the disclosure include a device configured to attach to a solar module and provide an ergonomic, comfortable, and safe means for carrying the solar module. The device may include one or more attachment devices, wherein each attachment device may include a channel for receiving a portion of a frame of a solar module. The device may be attached near the center of an edge of a solar module so that the weight of the solar module is balanced.

FIGS. 1A-1F are various illustrations depicting a carrier device 100 including a handle 101 and attachment devices 105. Each attachment device 105 may include a housing 106 and may be coupled to and extend away from handle 101. It is noted that handle 101 may be sized to provide a user with a comfortable and adequate means for lifting a module coupled thereto. Stated another way, a circumference and a width of handle 101 may be sized to provide a sufficient area for transmitting a load to a user's hand to minimize pain, discomfort, and/or fatigue to the user. In one example, a width W of handle 101 may be at least 3 inches and a diameter D may be substantially 1.25 inches.

Further, housing 106 may comprise any suitable material. As one example, housing 106 may comprise plastic. According to one embodiment, each attachment device 105 may comprise a hook-shape and include a channel 103 configured to receive a portion of a frame of a solar module. It is noted that although carrier device 100 is depicted as having two attachment devices 105, the present disclosure is not so limited. Rather, carrier device 100 may include one or more attachment devices 105.

Figure 2:
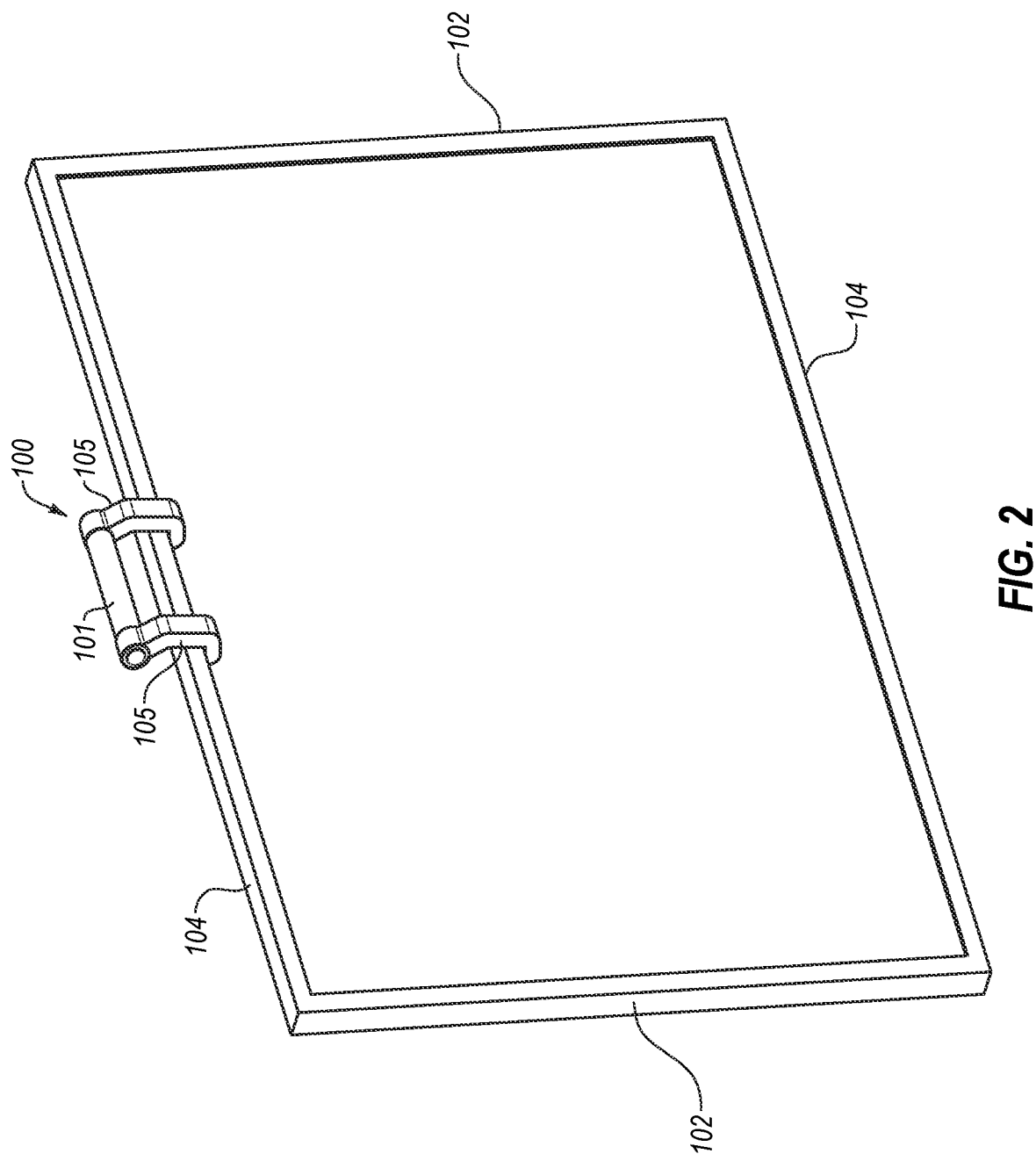
FIG. 2 illustrates a system including a carrier device coupled to a solar module, according to an embodiment of the present disclosure.
Figure 4:
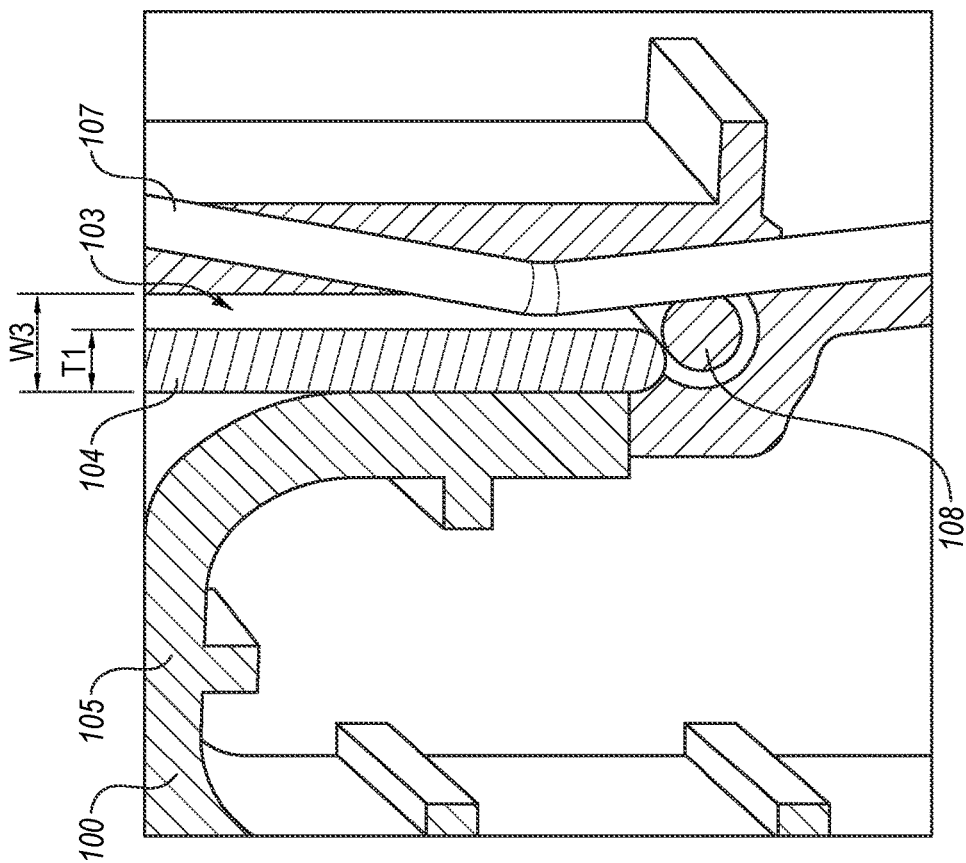
FIG. 4 is a zoomed-in view of a cut-out portion of carrier device coupled to a frame of a solar module, according to an embodiment of the present disclosure.
Figure 3:
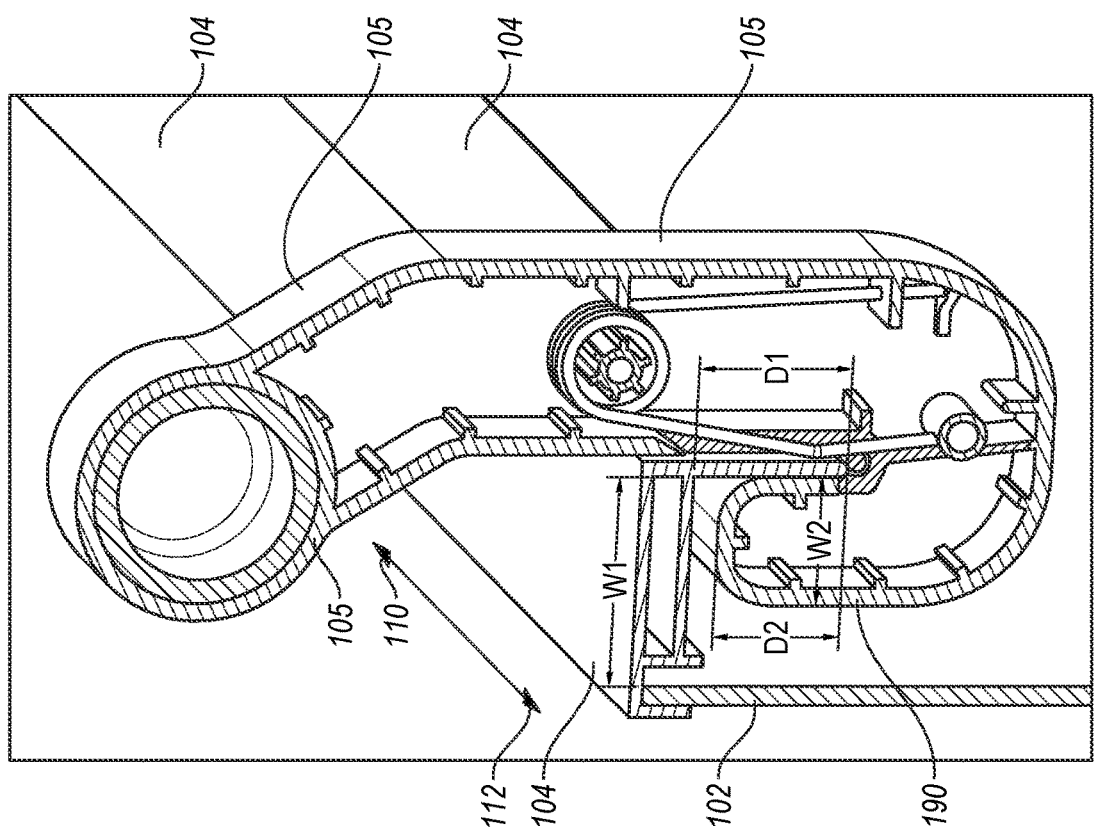
FIG. 3 illustrates a cut-out portion of carrier device coupled to a frame of a solar module, in accordance with an embodiment of the present disclosure.
Figure 7:
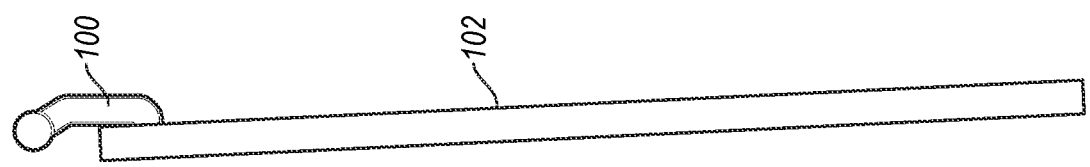
FIG. 7 is a side-view illustration of a carrier device coupled to a solar module, in accordance with an embodiment of the present disclosure.

FIG. 2 illustrates a carrier device 100 coupled to a solar module 102. More specifically, carrier device 100 is coupled to a portion of a module frame 104 of solar module 102. FIG. 3 is another illustration depicting a cut-out portion of attachment device 105 coupled to module frame 104. FIG. 4 is a zoomed-in illustration of a cut-out portion of attachment device 105 and module frame 104. As depicted in FIGS. 3 and 4, a portion of module frame 104 may be received in a channel 103 (see e.g., FIG. 4) of attachment device 105. FIG. 7 is another illustration of carrier device 100 coupled to solar module 102.

Figure 24:
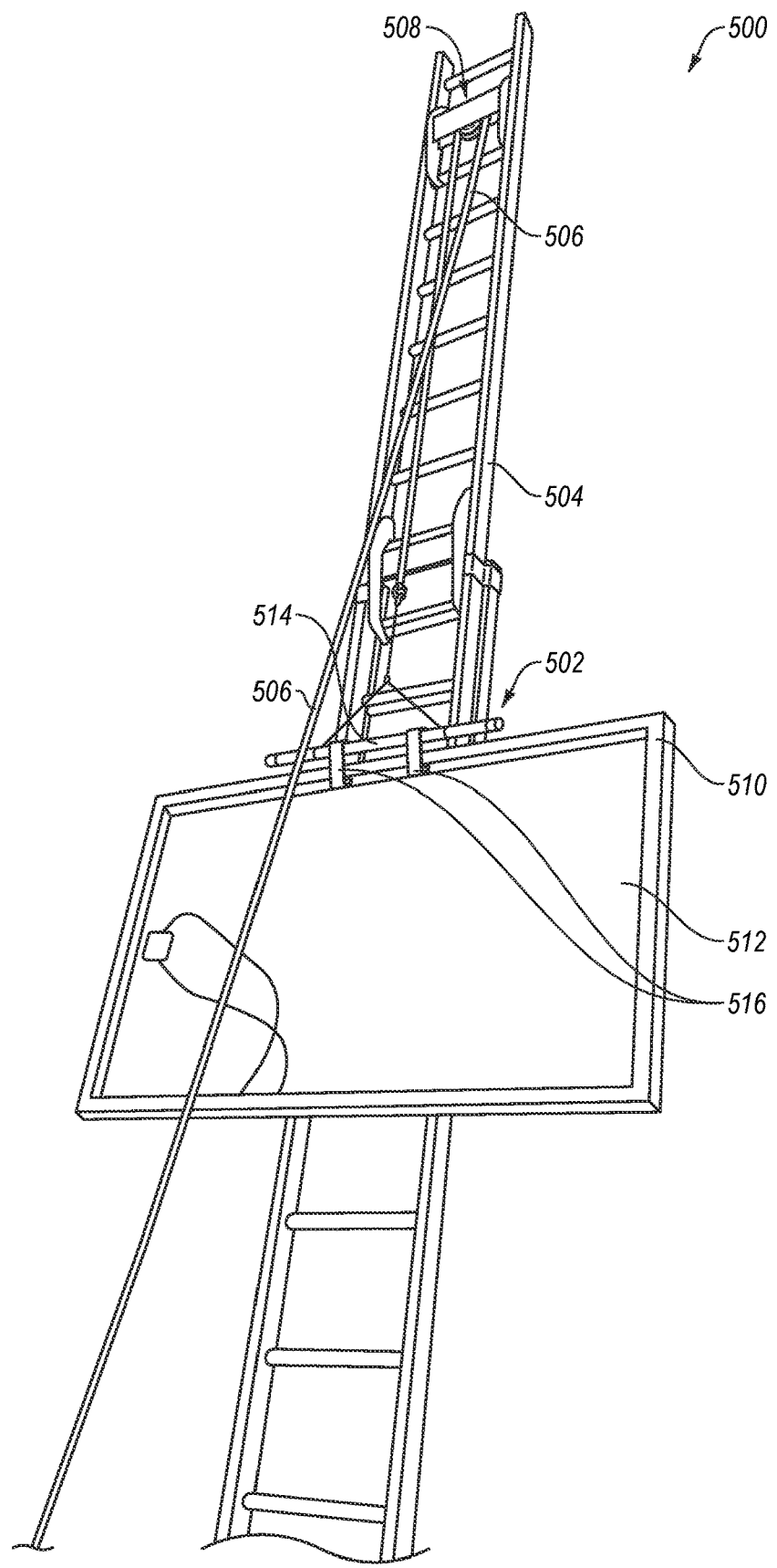
FIG. 24 illustrates a lift system, according to various embodiments of the present disclosure.

In one or more embodiments, a carrier device (also referred to herein as a "solar module lifting device," a "module lifting device," a "lifting device," a "module lift." or some variation thereof) may be used with a lift system (e.g., including a pulley system and/or a ladder). For example, a lift system 500, which includes a carrier device 502, a ladder 504, a rope 506, and a pulley 508, is illustrated in FIG. 24. In some embodiments, carrier device 502 may be the same as or similar to carrier device 100 described herein, handle 514 may be the same as or similar to handle 101 described herein, and/or attachment device 516 may be the same as or similar to attachment device 105 described herein.

For example, carrier device 502 may be attached to one end of rope 506, which may extend over pulley 508 that may be mounted above (e.g., at a top of a ladder (e.g., a standard fiberglass extension ladder), which may be, for example, leaning against a roof edge of a building). Carrier device 502 may be coupled to a frame 510 of a solar module 512. For example, the opposite end of rope 506 may be pulled by an operator (e.g., at or near the bottom of ladder 504), causing solar module 512 to slide up an outer surface of ladder 504 (i.e., the surface facing away from the building).

In some embodiments, pulley 508 may include a brake that prevents solar module 512 from sliding down ladder 504 (e.g., if the operator pulling the rope lets go). An operator on the roof and positioned near the top of ladder 504 may remove solar module 512 and release the brake so that carrier device 502 slides back down ladder 504. According to some embodiments, a weight of carrier device 502 (i.e., when not coupled to a module) may be greater than a weight of a section of rope 506 (e.g., the section of rope 506 from pulley 508 to the ground) plus the friction of the pulley and carrier on the ladder surface. If carrier device 502 is too light, carrier device 502 may not drop by itself when the brake is released, and an operator may need to climb the ladder to pull it down or another rope may be needed to pull it down which may not be desirable. For example, a ¾" diameter three-strand polyester rope weights substantially 0.15 pounds per foot. A two-section extension ladder may be approximately 22 feet long (e.g., from ground to top rung) when fully extended. Although a carrier device may have any suitable weight, in one non-limiting example, a carrier device may weigh substantially 4 pounds (e.g., 22*0.15=3.3 pounds plus 0.7 pound for friction) or more when a ¾" rope is used. With a longer ladder (e.g., three-section ladder) and/or a thicker rope, the carrier device may weigh more. If a lighter rope or shorter ladder is used, the carrier device may be lighter. In another non-limiting example, a three-section extension ladder may be approximately 29 feet long when fully extended (e.g., from ground to top rung), and a carrier device may weigh substantially 5.05 pounds (e.g., 29*0.15=4.35 pounds plus 0.7 pound for friction) or more when a ¾" rope is used.

For example, when a carrier device is lowered down the ladder (when not coupled to a module), a handle (e.g., a handle 514) of the carrier device may slide along and remain on the outer surface of the side rails of the ladder (i.e., the surface facing away from the building). In one example, an extension ladder may be substantially 34 cm wide (e.g., between the inner surfaces of the side rails). Although a handle (e.g., a handle 514) may have any suitable width, in one example, the handle may have a width of substantially 34 centimeters or more. Further, for example, a space between attachment devices (e.g., attachment devices 516 (e.g., attachment device 105 of FIG. 1)) may be less than the width of the handle.

With reference to FIG. 3, attachment device 105 includes a "nose" 190. When attachment device 105 is coupled to module frame 104, nose (also referred to herein as a "frontal hook portion") 190 may be positioned inside a portion of module frame 104 (i.e., between two edges of module frame 104) or between a portion of module frame 104 and back-sheet or back-glass of solar module 512 separated by a width W1, as shown in FIG. 3. For nose 190 to fit in this space (i.e., between the two edges of module frame 104 or between module frame 104 and back-sheet or back-glass), nose 190 may have a width W2, which may be less than width W1. For example, in one example of a solar module, width W1 may be substantially 22 mm or more, and although width W2 may be any suitable width, in this example, width W2 may be less than substantially 22 mm. In at least one more specific example, width W1 may be substantially 23.4 mm.

With reference to FIG. 4, in some examples, module frame 104 may have a thickness T1 of substantially 1.5 mm to substantially 2.5 mm, as noted above. Further, a width W3 of channel 103 may be greater than thickness T1 such that an edge of module frame 104 may be positioned in channel 103. However, if width W3 is too wide, then module frame 104 may not rest vertically enough in the channel 103 and the nose 190 may rotate relative to the module frame 104 and parts of the attachment device 105 (e.g., the nose 190) or handle 514 may contact the back sheet or back glass of the module causing damage. Therefore, the width W3 should not be too wide. In one example, a gap between the module frame and the inside of the channel of 1.5 mm allows enough margin for easy insertion and removal (e.g., if the module frame is 2.5 mm and the gap is 1.5 mm, then the channel width W3 may be 4 mm). Width W3 may be any suitable width. In one non-limiting example, width W3 may be greater than substantially 2.5 mm and/or less than substantially 4 mm.

With reference to FIG. 3, a typical module frame may have a depth D1 of, for example, approximately 15 mm to approximately 22 mm. Module frame 104 may rest in the channel to a resting channel depth D2 that is the distance from the top of the nose to the top of the anti-slip device. If depth D2 is too deep then the module frame 104 may not make contact with the anti-slip device 108. If depth D2 is too shallow, then module frame 104 may not rest vertically enough in channel 103 and nose 190 may rotate relative to the module frame 104 and parts of attachment device 105 (e.g., nose 190) or handle 514 may contact the back sheet or back glass of the module causing damage to the solar module. Resting channel depth D2 may be any suitable depth. In one non-limiting example, resting channel depth D2 is less than substantially 22 mm and/or greater than substantially 14 mm.

It is understood that carrier device 100 may include any number of attachment devices 105 enabling the carrier device to couple to more than one module. For example, carrier device 100 may include four attachment devices 105 such that it can couple to two separate modules. It is further understood that the handle 101 may enable multiple users to bear the load together or may be of a form that enables convenient coupling to a machine such as a crane, forklift, rope/cable pulley system, or storage rack. In general, handle 101 may be any suitable interface between carrier device 100 and a separate means of lifting and/or supporting the device. For example, handle 101 may be a simple eye-hole for accepting a hook or a rope or it may be a threaded hole for accepting a variety of attachments or interfaces.

Figure 11:
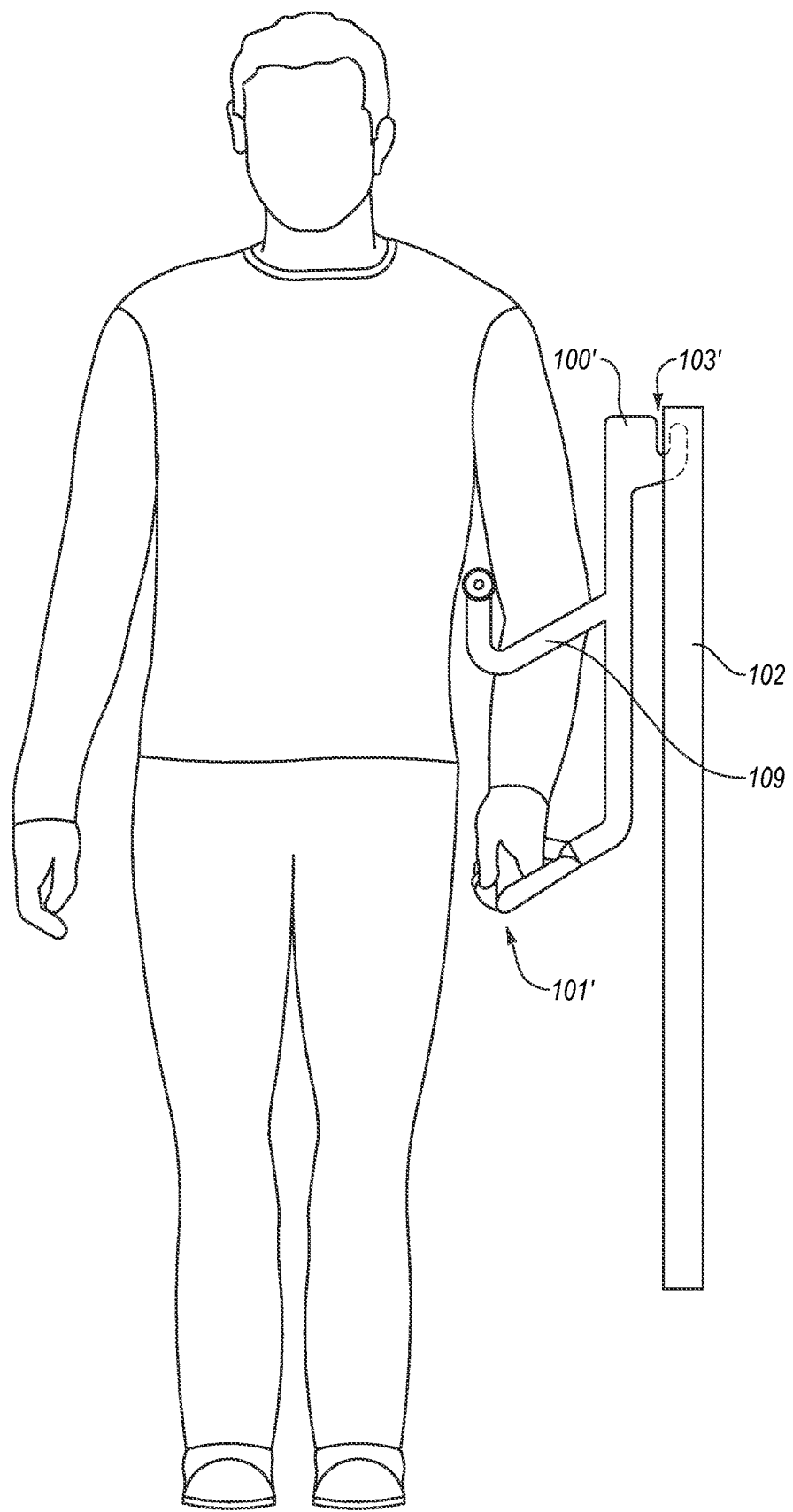

While the vertical offset between the bottom of channel 103 and the center of the handle 101 is short (e.g., as shown in FIGS. 1A and 2) compared to the height of the module (e.g., approximately 4" from the bottom of channel 103 to the center of the handle 101, as shown), the vertical offset may be longer as depicted in a carrier device 100' shown in FIGS. 10 and 11, for example. As an example, the length may be comparable to the typical length of a human arm from palm to shoulder (e.g., 24 inches). This may enable the user to maintain a relatively straight arm when lifting and carrying the module, making the weight of the module easier to bear.

With reference to FIGS. 10 and 11, carrier device 100' includes an arm brace, channel 103', and a handle 101'. In one embodiment, an arm brace 109, which is attached to carrier device 100', rests against the inside of the user's arm. This brace may help counteract the torque created by the horizontal offset and longer vertical offset, making it easier to carry for the user. The added lifting comfort of this longer vertical offset embodiment becomes even more important when carrier device 100 is enabled to couple to more than one module because the weight becomes more challenging for the user.

Figure 1E:
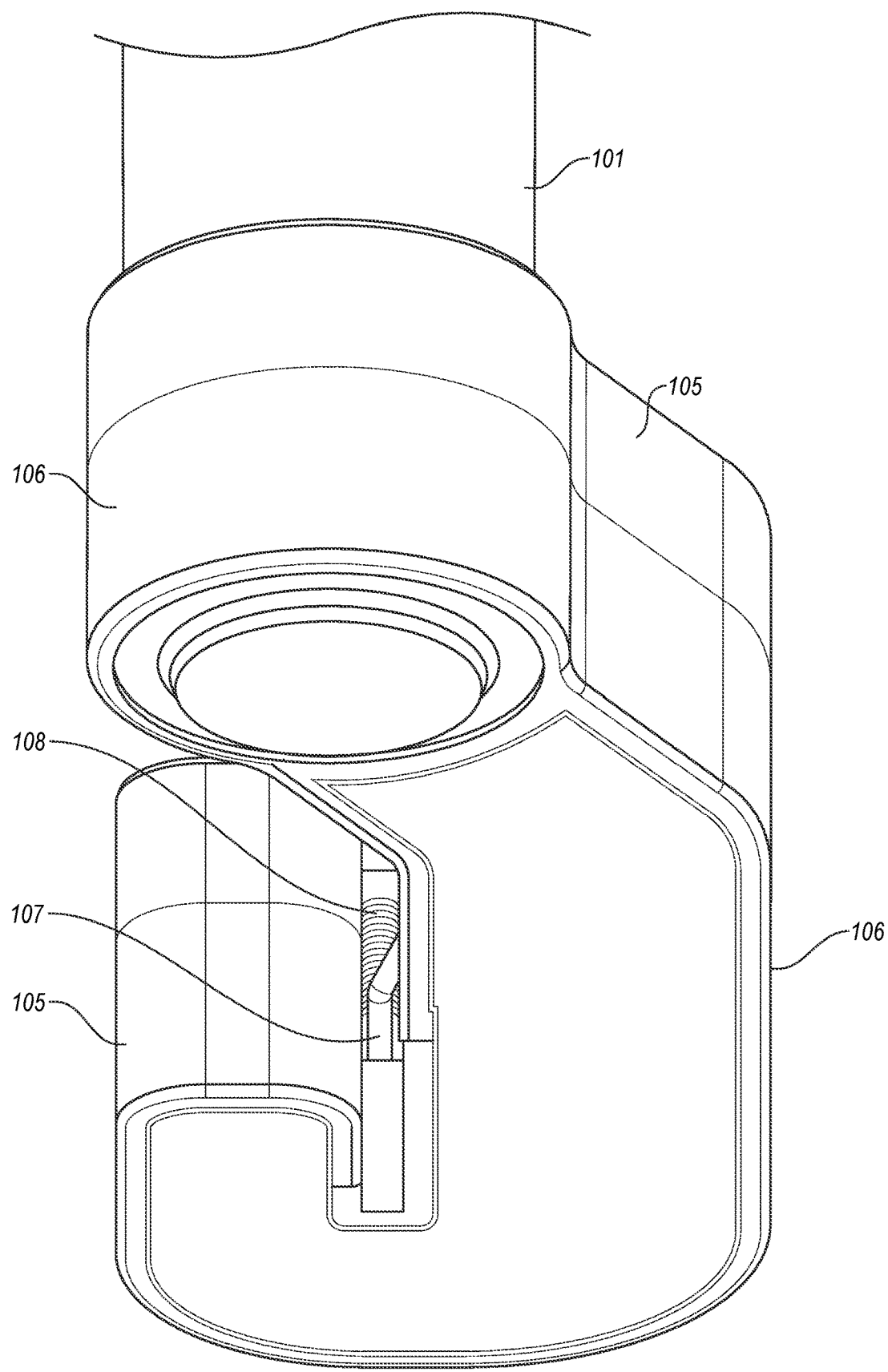
Figure 1F:
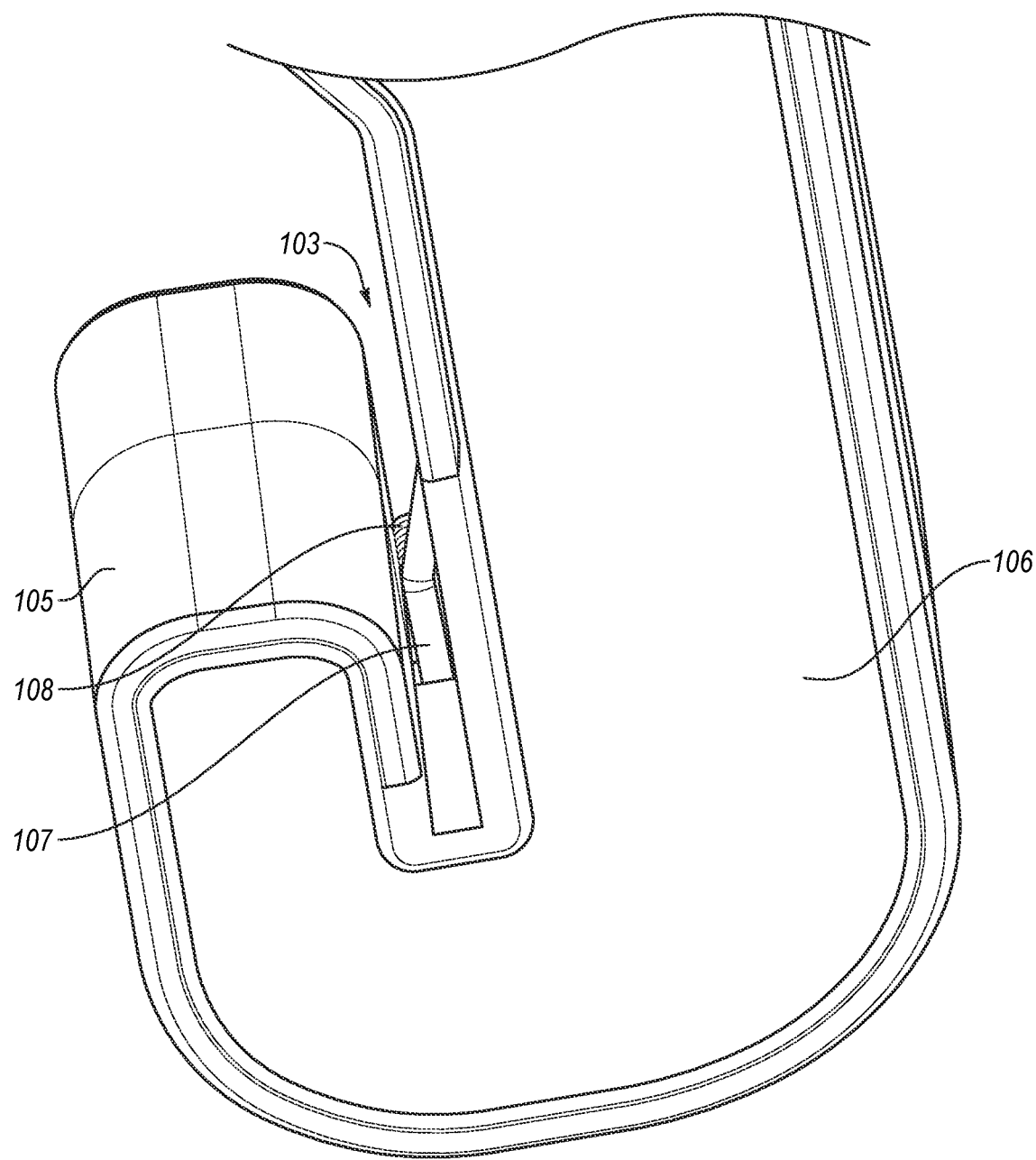

According to one embodiment, attachment device 105 may include an engagement device 107 (see e.g., FIGS. 1E, 1F, and 4). In one example, engagement device 107 may comprise a positive-engagement device, which may include, for example, a spring-loaded member. Engagement device 107 may be configured to be displaced by module frame 104 upon frame being positioned within channel 103. Further, upon attachment (e.g., full engagement) of engagement device 107 to module frame 104, an audible and/or tactical feedback may be provided (e.g., to a user). The feedback may indicate to the user that the load of module 102 may be borne by carrier device 100 without disengaging. Engagement device 107 may also be configured to prevent carrier device 100 from detaching from solar module 102 if the user lets go of carrier device 100 (e.g., when module 102 is lowered to the ground). According to a specific embodiment, engagement device 107 may include a spring, such as, for example only, a metal torsion spring, to create friction against module frame 104. The spring may comprise any suitable material. In one example, the spring may include a molded plastic spring.

Attachment device 105 may further include an anti-slip device 108 (see e.g., FIGS. 1F and 4), which may be configured to limit, and possibly prevent, movement of module frame 104 in channel 103. More specifically, anti-slip device 108 may limit, and possibly prevent, movement of module frame 104 in a first direction (indicated by arrow 110; see FIG. 3), and/or a second, opposite direction (indicated by arrow 112; see FIG. 3). This is particularly important if carrier device 100 is not balanced, for example, if carrier device 100 is not attached near the middle of an edge of module frame 104 of module 102, or if module 102 is bumped while carrying. Anti-slip device 108 may create friction between carrier device 100 and an edge of module frame 104. According to one embodiment, anti-slip device 108 may comprise a piece of rubber, foam, gel, and/or other high-friction material. In one example, the high friction material may deform under the weight of the module, increasing the friction. According to various embodiments, an attachment interface (e.g., handle 101) and attachment device 105 may include a single piece of continuous material (e.g., metal). That is the attachment interface (e.g., handle 101) and attachment device 105 may be fabricated from a single piece of material (e.g., metal). According some embodiments, an attachment interface (e.g., handle 101), attachment device 105, and anti-slip device 108 may include a single piece of continuous material (e.g., metal). That is the attachment interface (e.g., handle 101), attachment device 105, and anti-slip device 108 may be fabricated from a single piece of material (e.g., metal).

Figure 17:
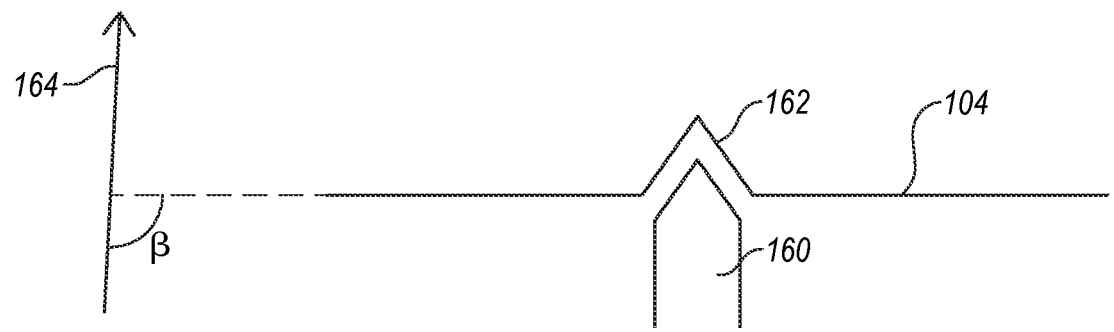
FIGS. 17 and 18 depict an anti-slip device, according to an embodiment of the present disclosure.
Figure 18:
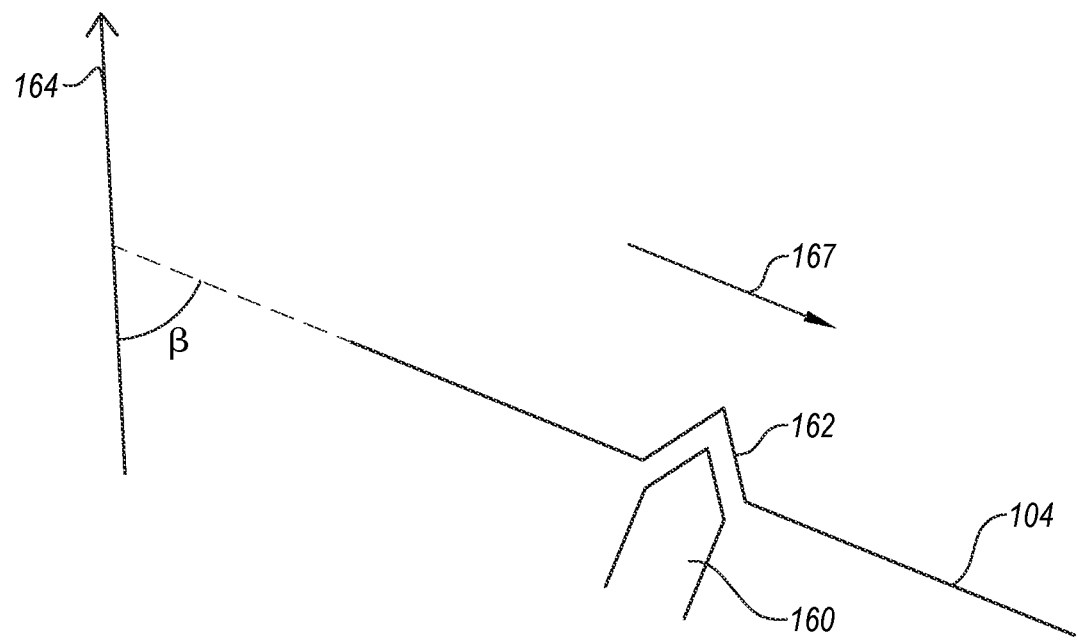

According to one embodiment, anti-slip device 108 may comprise one or more sharp edges configured to contact, and possibly penetrate (e.g., "bite into"), at least a portion of an edge of module frame 104. With reference to FIGS. 17 and 18, a penetration of one or more sharp edges 160 into module frame 104 is caused by the lifting force (i.e., in a direction noted by arrow 164) and may create a deformation 162 in an edge of module frame 104. Deformation 162 may create an interference laterally along the edge of module frame 104 and one or more of sharp edges 160. The weight of the module may help maintain the position of the one or more sharp edges in a deformation even as a relative angle β between the lifting direction of handle 101 and the top frame of the module changes from substantially 90 degrees to more or less as shown in FIGS. 17 and 18. For example, angle β may decrease to substantially 60 degrees as a user lifts because carrier device 100 was not attached near the middle of the module frame.

Figure 5A:
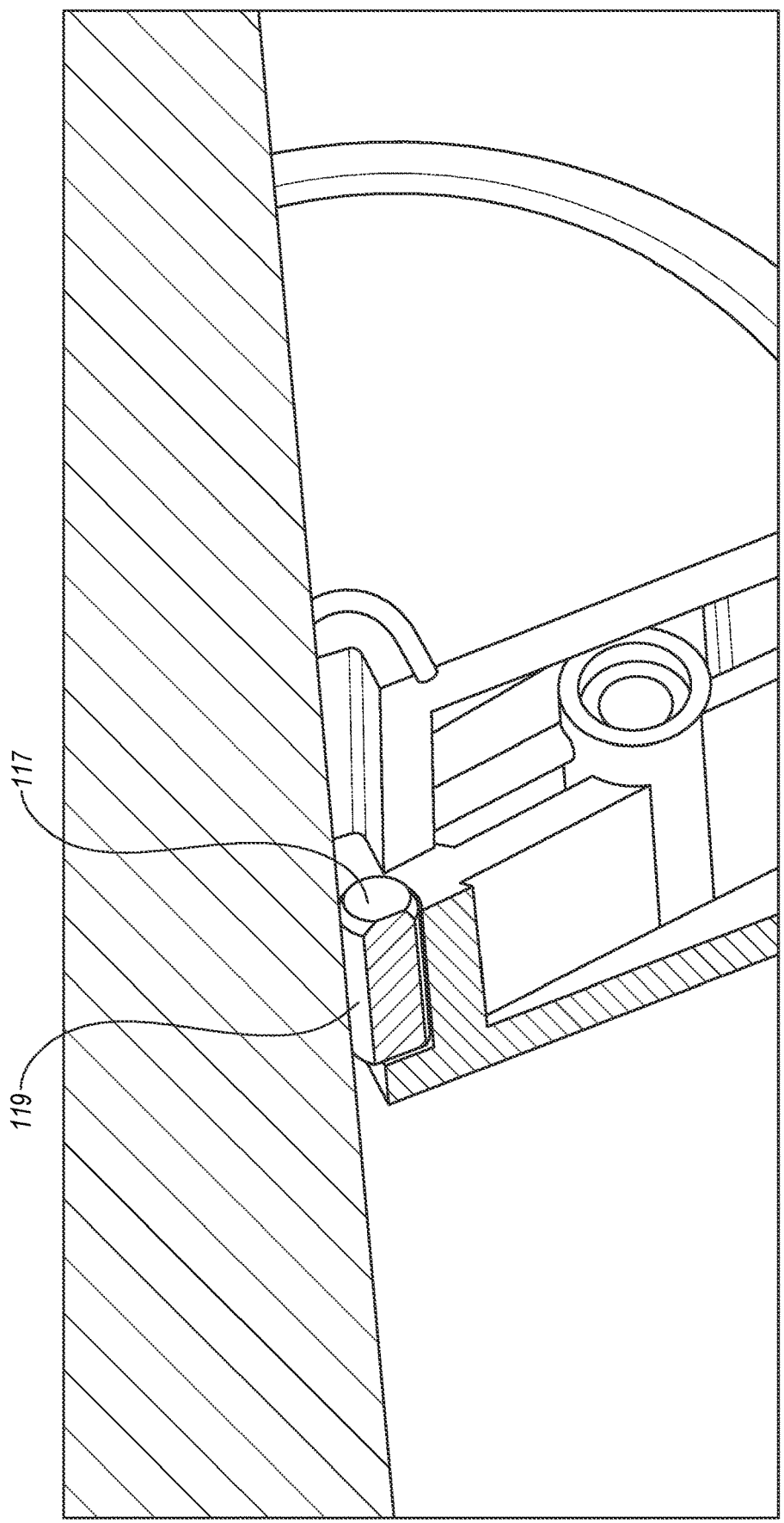
FIGS. 5A and 5B depict an anti-slip device of a carrier device, according to an embodiment of the present disclosure.
Figure 5B:
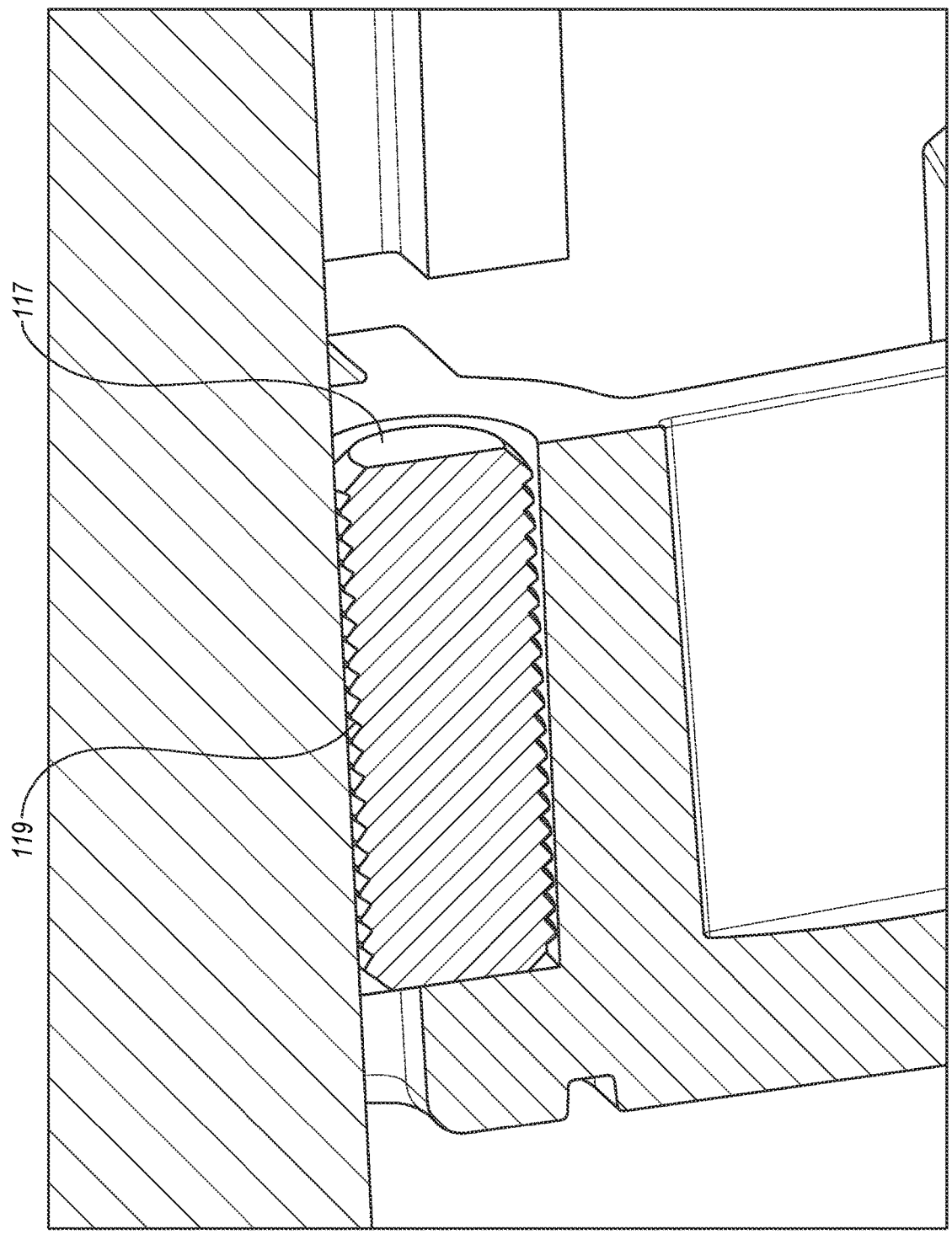

Without the anti-slip device, the module frame may have a tendency to slip in the channel in the approximate direction as indicated by arrow 167 in FIG. 18. The interference between one or more sharp edges 160 and deformation 162 in module frame 104 may prevent module frame 104 from sliding in channel 103. A minimum angle before slippage may be determined by the weight of the module, the depth of the cut, the strength of the material of module frame 104, one or more sharp edges 160, and the angle of the cutting surface of one or more sharp edges 160. One more sharp edges 160 may be made of a material that is stronger than a material of module frame 104. Solar module frames are typically aluminum, so the one or more sharp edges 160 may comprise, for example, stainless steel. This difference in hardness (i.e., between module frame 104 and one or more sharp edges 160) may minimize the deformation of one or more sharp edges 160 over time, which could lead to reduced effectiveness. In one example, anti-slip device 108 may include one or more threaded rods 117 aligned so that the axis of the one or more rods is parallel to the edge of module frame 104 (see FIGS. 5A and 5B). In this non-limiting example, the threads 119 may be made of a material that is stronger than the material of module frame 104 and the "landing" width of the thread tip(s) in contact with the edge of module frame 104 is, for example only, ⅛ the thread pitch. Solar module frames are typically aluminum, so the rod may comprise, for example, stainless steel. This difference in hardness (i.e., between the module frame and the rod) may minimizes the deformation of the threads over time.

As noted above, housing 106 may comprise any suitable material, such as, for example only, plastic. In this example, the plastic supporting the threads tips on the far-side from the frame edge yields when first loaded (i.e., after being manufactured), but as the threads penetrate into the plastic, more plastic area is loaded, until equilibrium is reached at a stress level below yield, given that adequate total pin area is provided. Penetration of the threads into the plastic is beneficial in that it prevents the threaded pin from sliding unrestrained relative to the plastic.

The amount that the one or more sharp edges 160 or rod threads 119 penetrate ("bite") into the module frame edge is not significant to the function or aesthetics of the module. For example, they typically penetrate (e.g., "bite") in less than 0.1 mm and the penetrations (e.g., "bites") are on the underside of the module 102 and so will typically not be seen once module 102 is installed in a system.

Figure 12A:
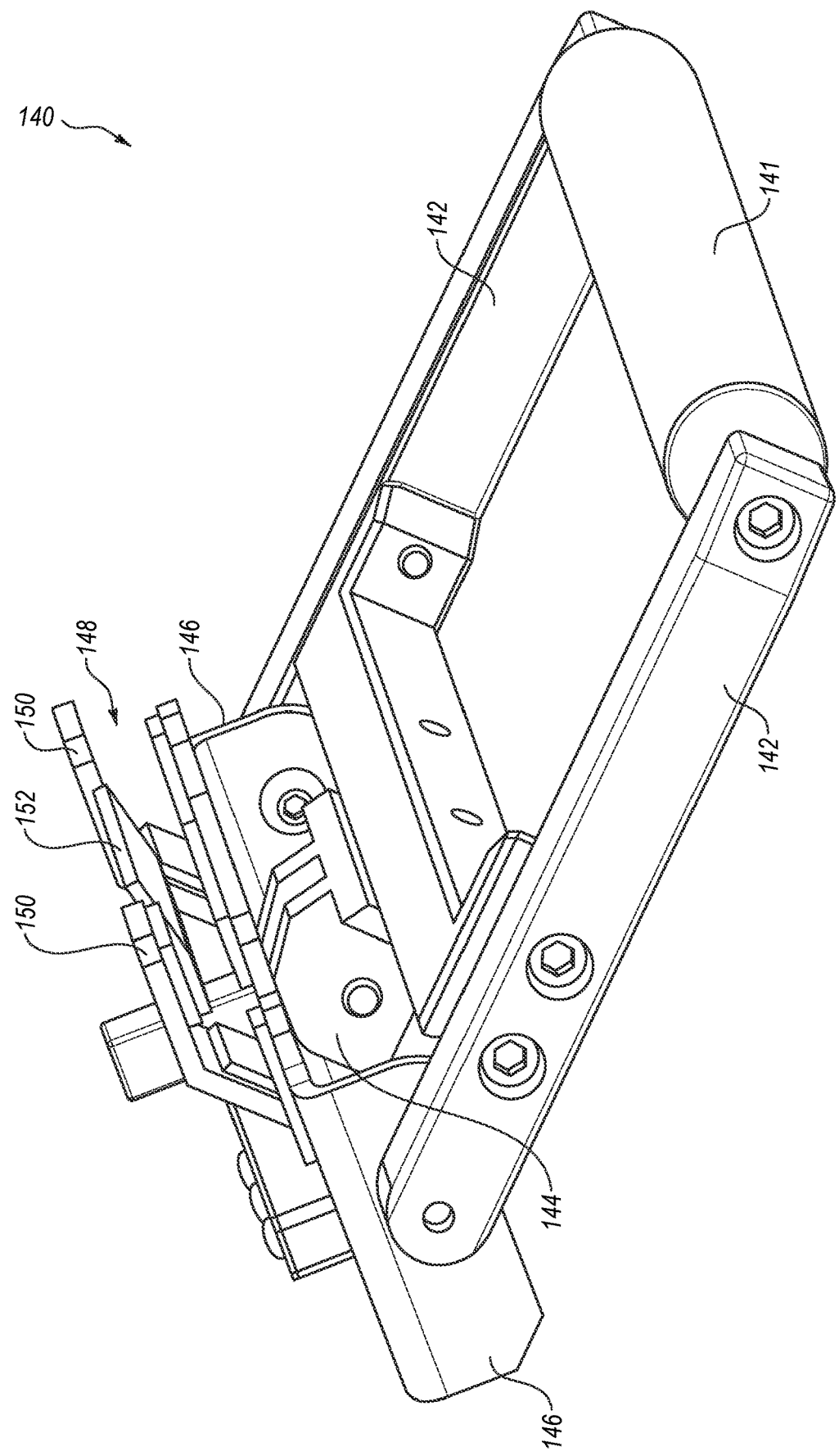
FIGS. 12A and 12B depict an anti-slip device including a clamp, in accordance with an embodiment of the present disclosure.
Figure 12B:
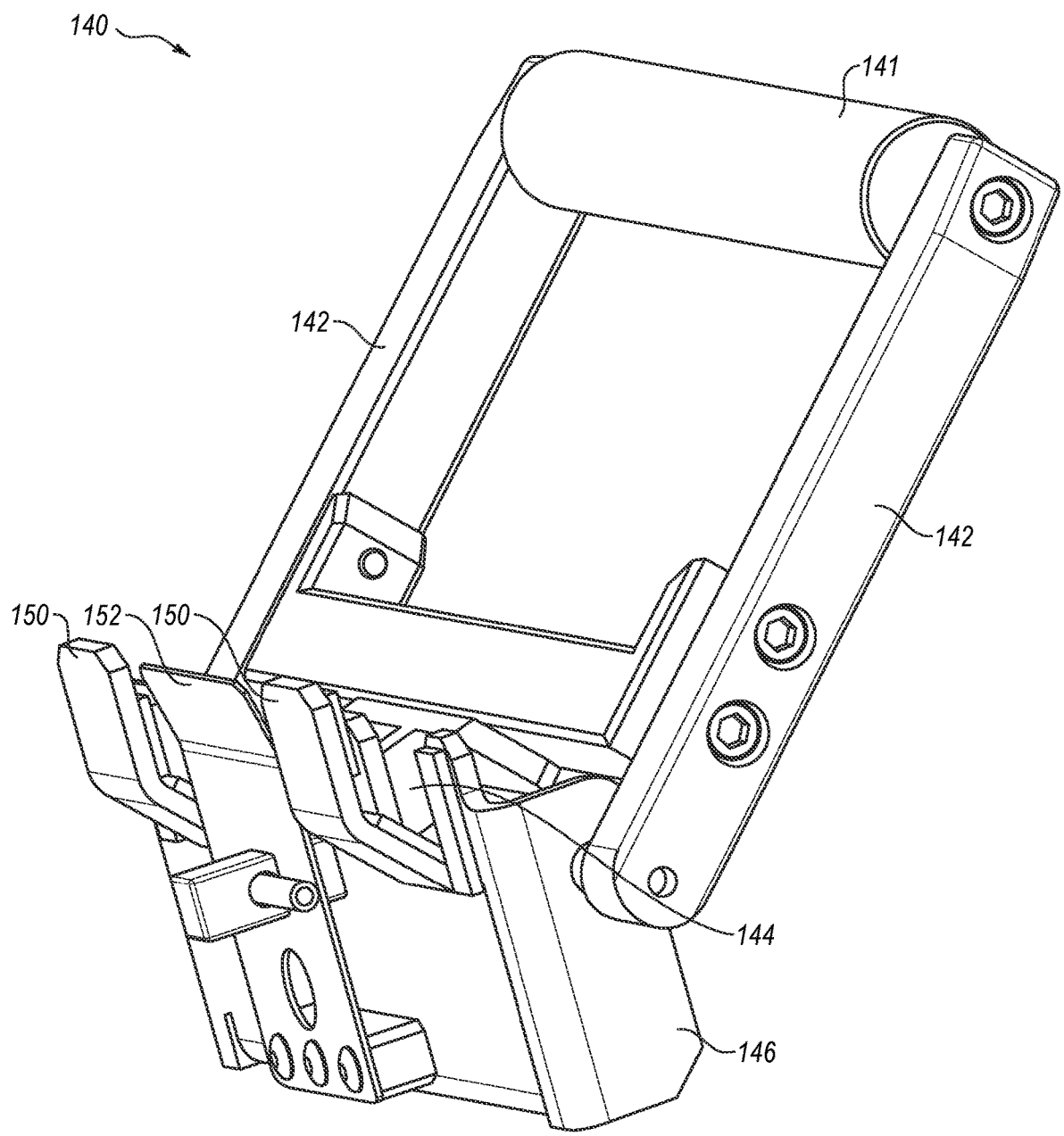

According to another embodiment, anti-slip device 108 may comprise a clamp configured to secure module 102 to carrier device 100 by pinching the module frame. For example, anti-slip device 108 may include an over-center cam configured to clamp the edge of the module frame (e.g., in response to a lifting force). FIGS. 12A and 12B illustrate one non-limiting example of a clamp 140 including a handle 141, a frame 142, and a cam 144, which all pivot together about a base 146. Base 146 includes a channel 148 that supports a solar module frame by outboard tabs 150. Base 146 may also include a spring 152, which when loaded, flexes laterally to pinch the solar module frame. A load to spring 152 may be delivered via a square post link, which in turn is connected to cam 144. Thus, rotation of the assembly (i.e., handle 141, frame, 142, and cam 144) in a first direction may clamp the solar module frame. Rotation in second, opposite direction may unclamp the solar frame. Rotation in the first direction may be induced by a vertical lifting action of handle 141 causing the assembly (i.e., handle 101, frame, 142, and cam 144) to rotate and clamp the module.

Figure 6:
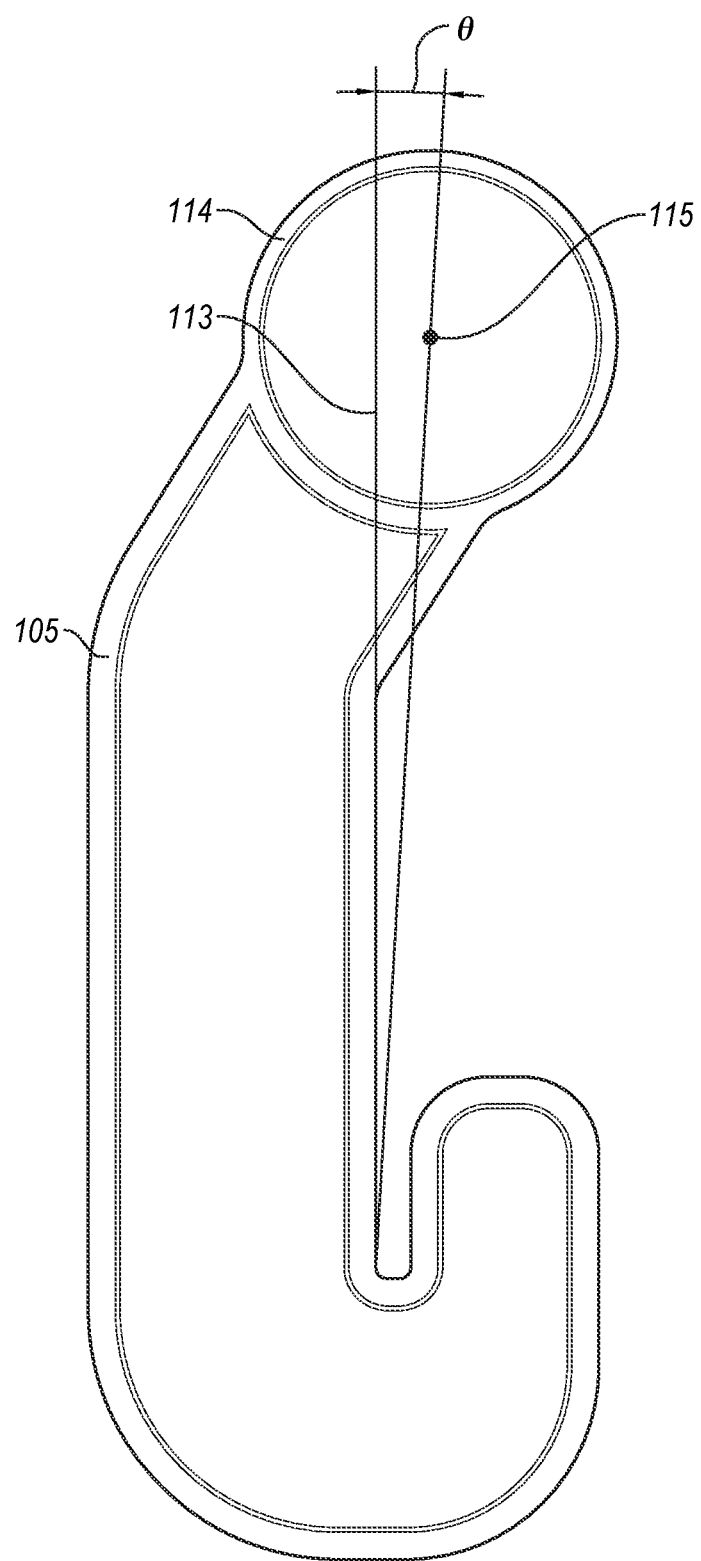
FIG. 6 is a side-view illustration of an attachment device of a carrier device, according to an embodiment of the present disclosure.

FIG. 6 depicts a portion of an attachment device 105 including a handle-receiving portion 114 (i.e., a portion of attachment device 105 configured to couple to a portion of handle 101). According to one embodiment, a center 115 of handle-receiving portion 114 may be offset (e.g., horizontally) from the plane 113 of channel 103 (as indicated by line 113). More specifically, with reference to FIG. 6, center 115 may be aligned in a lifting direction to the vertical angle of channel 103. This alignment may reduce rocking of the edge of module frame 104 in channel 103 (e.g., when carrier device 100 is lifted and a user leans forward, which can create a feeling of insecurity for the user). In one example, this alignment is past the line of loading between the center 115 of handle-receiving portion 114 and the center of gravity ("CG") of solar module 102 (e.g., by ¼ inch). The resulting angle Θ (i.e., for the example handle geometry shown in FIG. 6) between the plane 113 of channel 103, and the "handle plane" (i.e., the plane intersecting the anti-slip device threads' contact point(s) and a center of handle-receiving portion 114) is, for example only, approximately 2.2 degrees. In this specific example, the torque about the center of mass of solar module 102 is 42 lbf×(0.25 in)=10.5 lbf-in, which exceeds the resisting torque of engagement device (i.e., two torsion springs in this example), which has a torque of 2×7 lbf×0.45 in=6.3 lbf-in. This may force an edge of module frame 104 to the same angle in channel 103 that may occur when carrier device 100 is lifted and the user leans forward.

Figure 13:
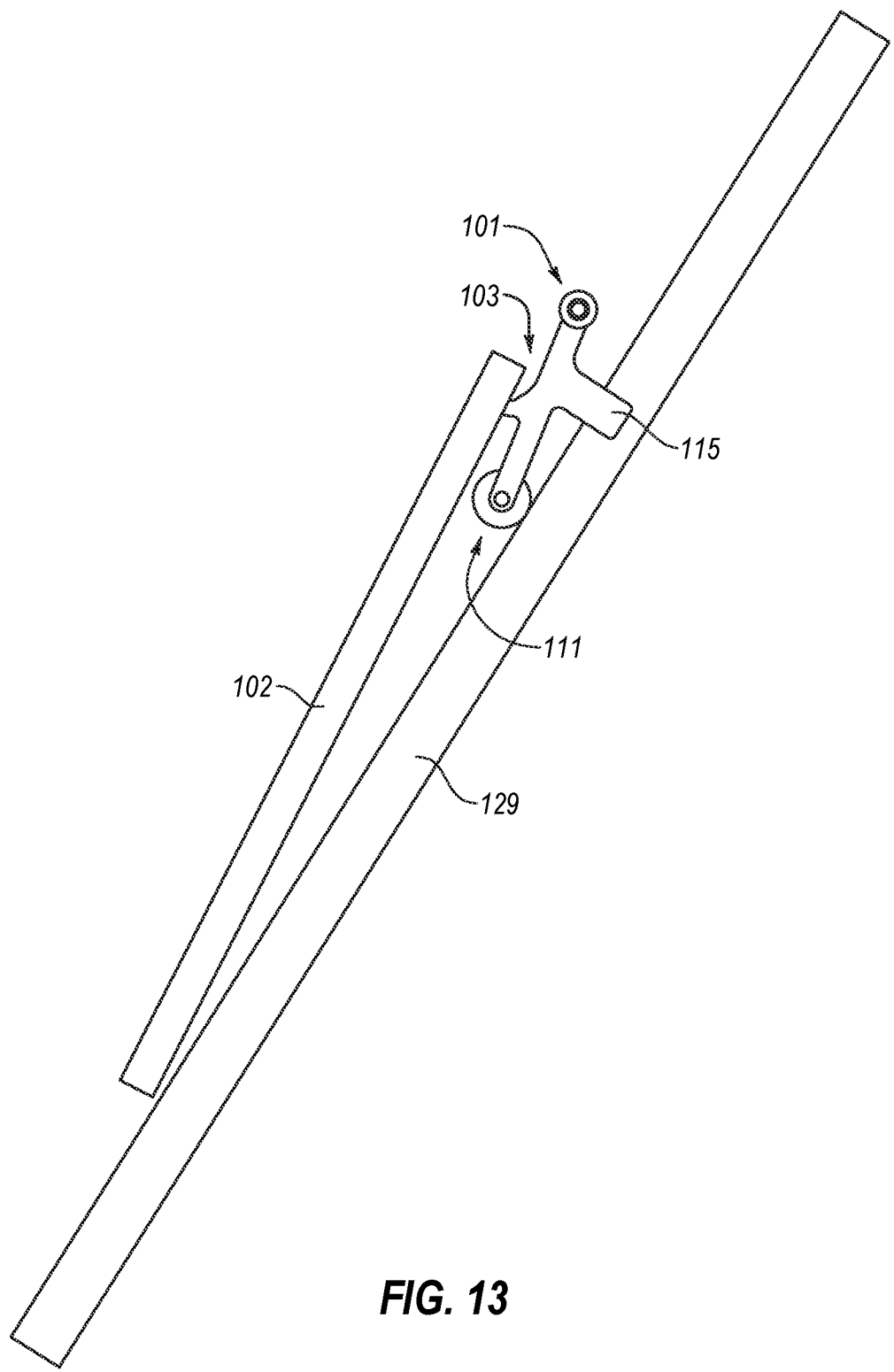
FIGS. 13 and 14 depict a carrier device including one or more wheels, according to an embodiment of the present disclosure.
Figure 14:
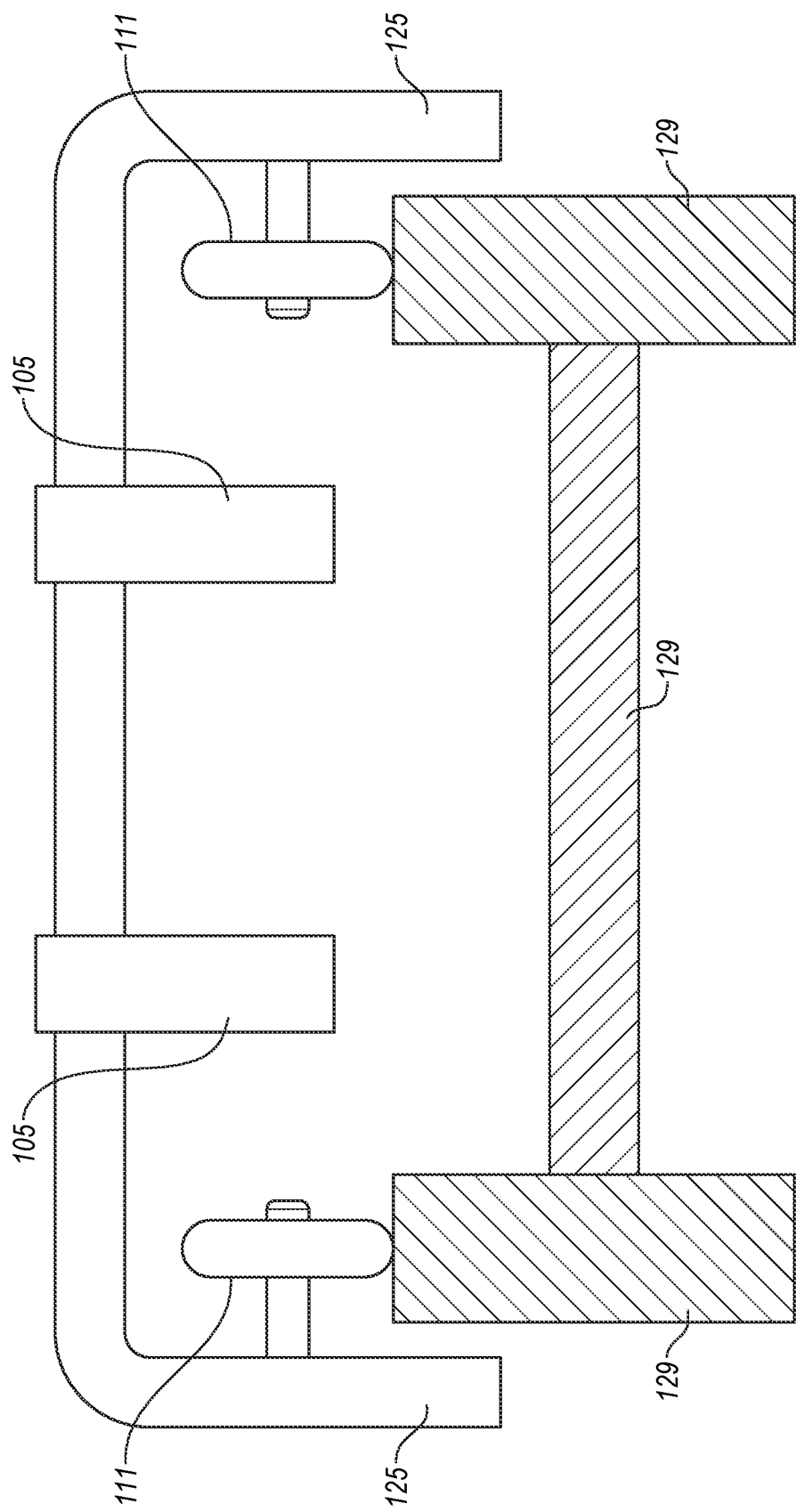

In another embodiment illustrated in FIGS. 13 and 14, carrier device 100 may include one or more wheels 111 configured to ride along a rail of a ladder 129 supporting part of the weight of module 102. Carrier device 100 may further include one or more guides 125 that may maintain the position of wheels 111 centered on top of the ladder rails as carrier device 100 slides along ladder 129. In one example, when combined with a rope and pulley system, this embodiment may provide a low cost means of hoisting a module to a roof without a user needing to be on a ladder. One end of rope may attach to handle 101. The pulley may be mounted at the top of the ladder. The user may pull the other end of the rope to slide the module up the ladder.

Figure 8:
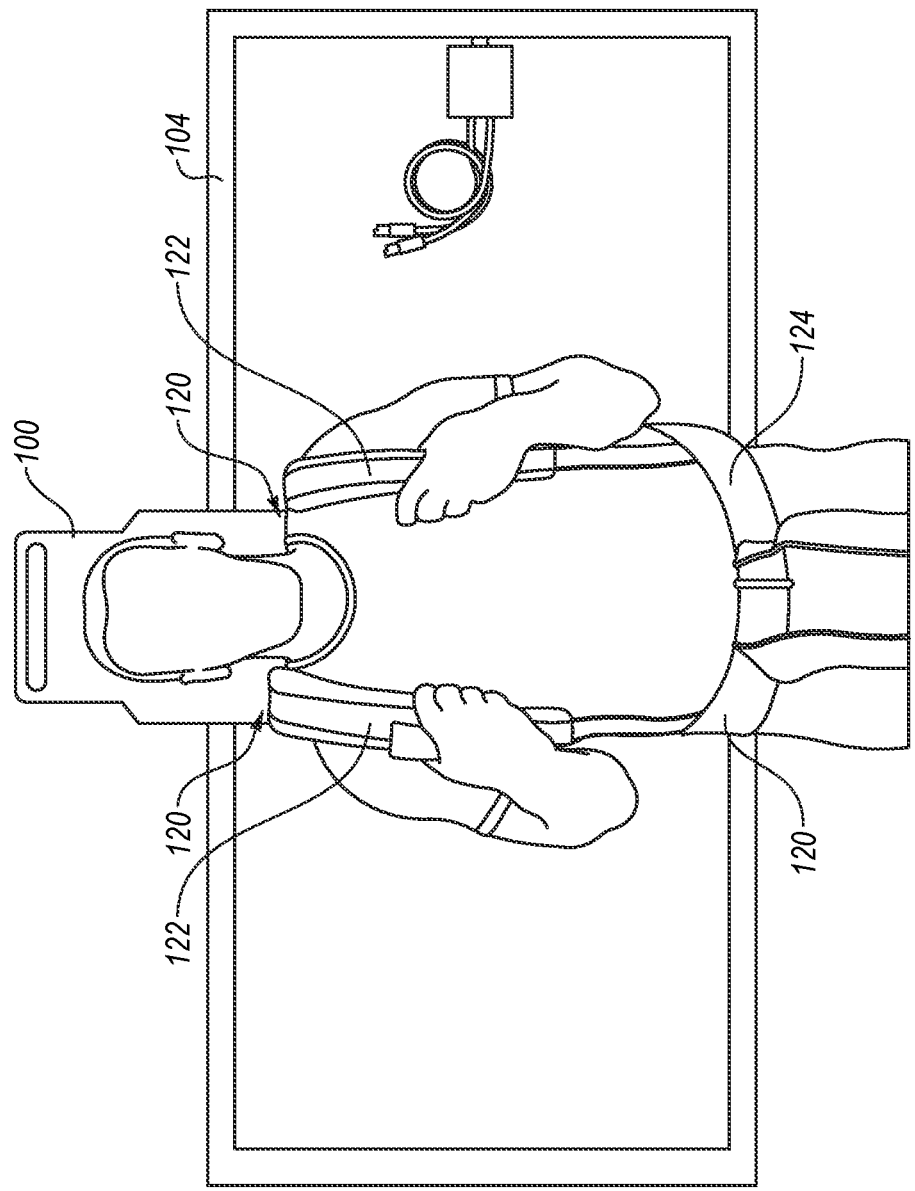
FIG. 8 depicts a user wearing a securing apparatus coupled to a solar module, in accordance with an embodiment of the present disclosure.
Figure 15:
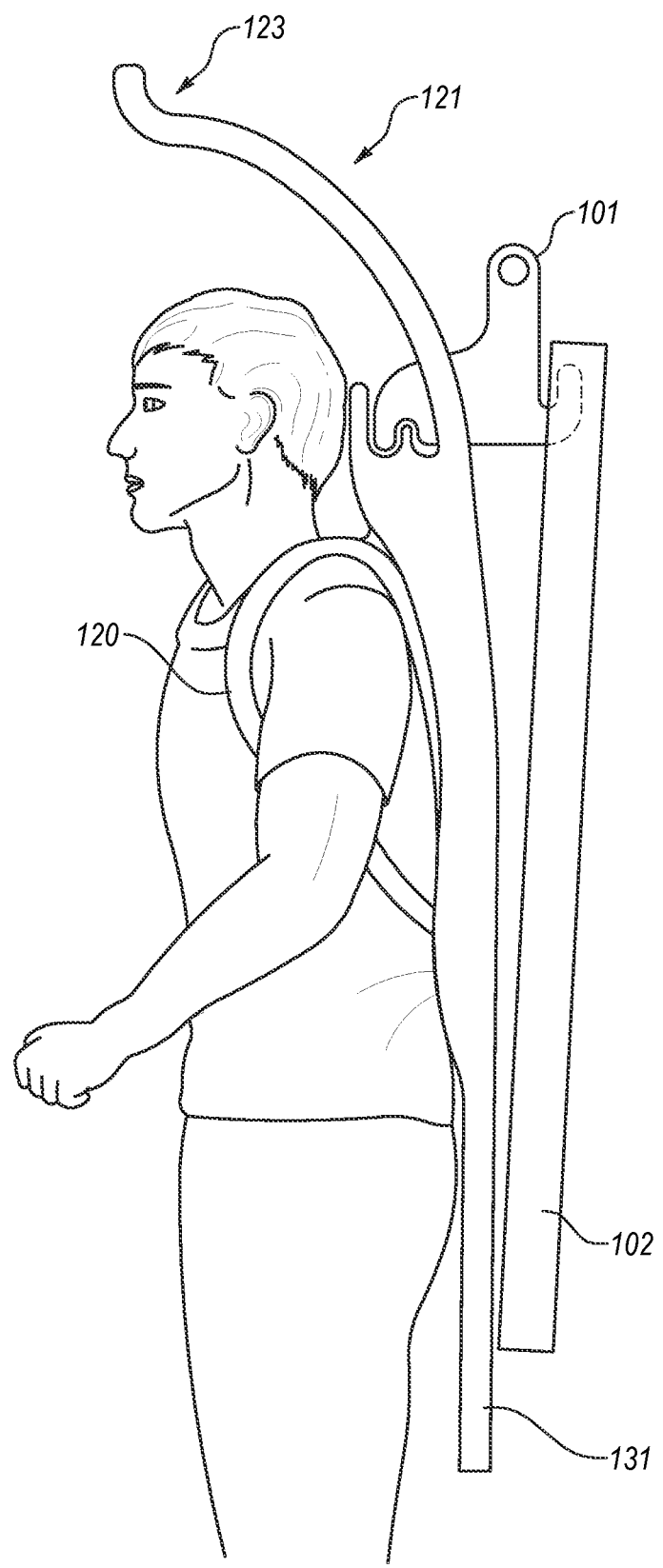
FIGS. 15 and 16 illustrate a carrier device, in accordance with an embodiment of the present disclosure.

With reference to FIGS. 8 and 15, in another embodiment, carrier device 100 may include a securing apparatus (also referred to herein as a "harness") 120 configured to couple to at least one of handle 101 and attachment device(s) 105. More specifically, harness 120 may include a latching mechanism for removably coupling to handle 101, one or more attachment devices 105, or both. In one embodiment, harness 120 may be permanently attached to handle 101, one or more attachment devices 105, or both. Harness 120 may be any suitable harness configured to couple to a user in a manner to free the user's arms and hands and move solar module 102 (e.g., climb a ladder or do other tasks). Thus, harness 120 can enable the user to maintain three points of contact (e.g., with a ladder). For example, harness 120 may include one or more shoulder straps 122 and may be worn like a backpack.

During one contemplated use, a user may lift handle 101 and module 102 over his/her shoulder and releases it onto the latching mechanism of harness 120. Module 102 is consequently securely attached to the user's back and will not slip off. To remove the module, the user may reach over her/his shoulder or head, and grab and lift handle 101 to release handle 101 and module 102 from harness 120. In one embodiment, harness 120 may include a waist belt 124 instead of, or in addition to, shoulder straps 122.

Figure 16:
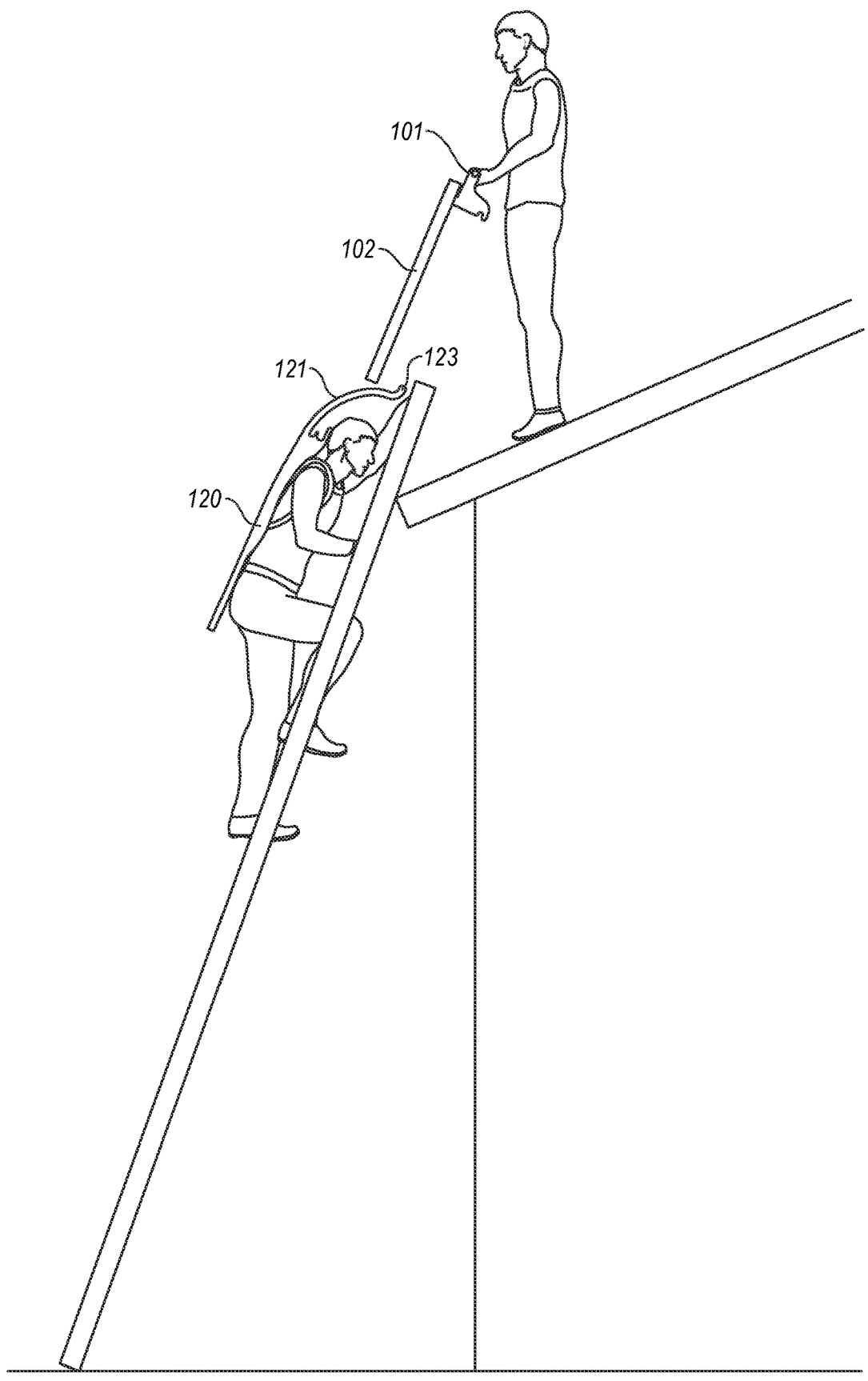

With reference to FIGS. 15 and 16, during another contemplated use, a first user climbs a ladder with harness 120 and at least one module 102 secured to his/her back. When the first user reaches the top of the ladder a second user may grab handle 101 of carrier device 100 and lift module 102 off of the first user and on to a roof. In one embodiment, harness 120 includes a track 121 that guides the removal of module 102 by a second user. Track 121 may protect a head of the first user from getting hit by the bottom of module 102 as the second user pulls module 102 toward him/her. Track may include a lip 123 that may catch a bottom edge of module 102 and prevents it from sliding off of track 121. The second user may then lift the weight of module 102 completely off of lip 123. Track 121 may further include a means of resting on the ladder. This has the benefit of transferring the weight of module 102 as it is being slid along track 121 and resting in lip 123 onto the ladder so that the first user does not need to bear the full weight.

In one embodiment, as illustrated in FIG. 9, carrier device 100 may include a harness 120' and handle 101. In one embodiment, one or both shoulder straps 122' of harness 120' may be ridged and may not be complete loops. Carrier device 100 may be lifted directly onto a user's shoulders or a user may squat under shoulder straps 122' and then stand to lift module 102. This may eliminate the need for a reliable latch between handle 101 and shoulder straps 122'. It may also eliminate the physical challenge of lifting a module over a user's shoulder, allowing the user to lift with his/her legs rather than his/her arms.

In one embodiment, harness 120/120' may include one or more surfaces 131 (see FIG. 15) that extend downward below a bottom of module frame 104. This may provide a surface for the bottom frame to rest against so that it does not rest instead on the back of the user's legs or buttocks.

If a user is climbing a ladder with carrier device 100 and harness 120 on his/her back, wind may catch the large surface area of module 102 and cause a force that could cause a user to lose his balance or grasp of the ladder. A wind vector coming from the side sees a small module surface area and therefore will have little impact on the user. A wind vector that has a large force component perpendicular to the outer face of module 102 may tend to push the user into the ladder, which may be uncomfortable for the user, but may not be dangerous. However, a wind vector that has a large component perpendicular to the underside of module 102 (i.e., the side of the module facing the user) can tend to push the module and user away from the ladder potentially creating a dangerous condition in which, for example, the ladder pulls away from the roof eve, or the user loses his/her grip on the ladder. In other embodiments, the present disclosure includes a wind force abatement device configured to allow module 102 to align itself at least partially parallel to the wind direction so as to reduce the force of the wind acting on the user via module 102 and harness 120.

Figure 19:
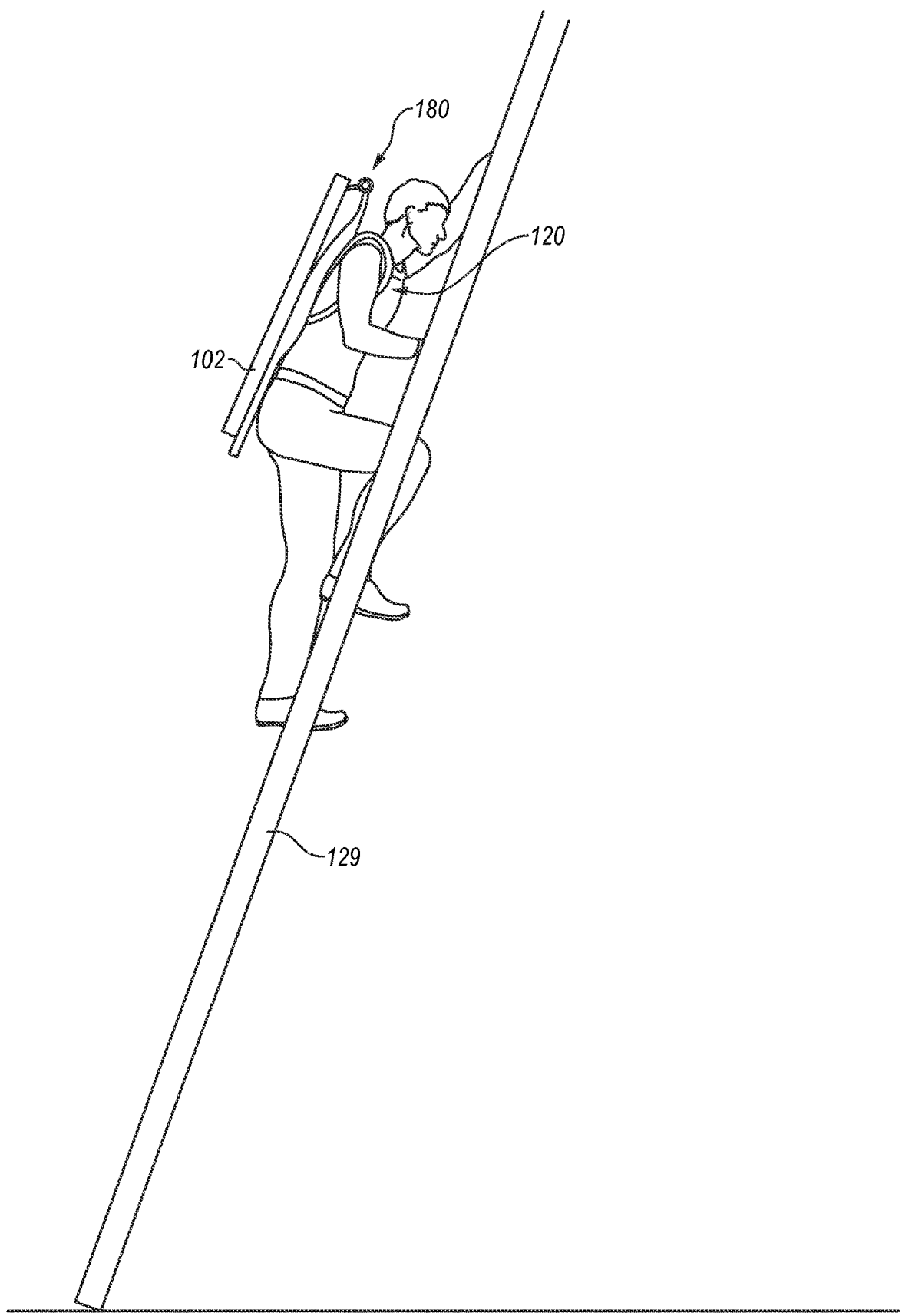
FIGS. 19 and 20 illustrate a wind abatement device, according to an embodiment of the present disclosure.
Figure 20:
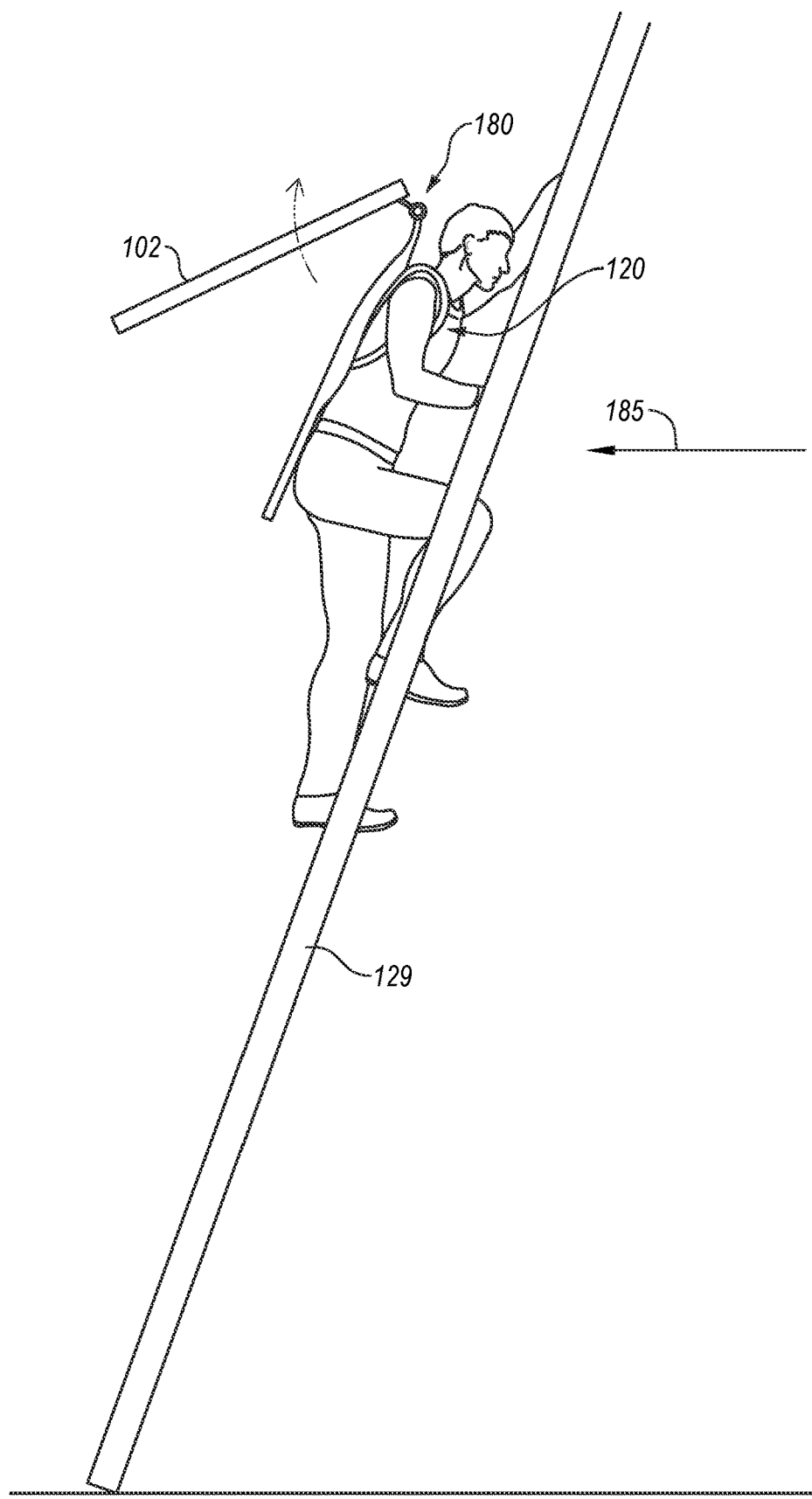

With reference to FIGS. 19 and 20, in one example, a wind force abatement device 180 may include a hinge aligned axially with module frame 104 and/or handle 101. Any wind force vector component (e.g., as indicated by arrow 185) that may be substantially perpendicular to the underside of module 102 (i.e., the side of the module facing the user) that overcomes the downward torque caused by weight of module 102, may rotate the module about the hinge. Eventually, as module 102 (and attachment device(s)) rotates about the hinge, the wind vector component perpendicular to the underside of the module 102 may be reduced. Module 102 may stop rotating when equilibrium is reached. When the wind stops, module 102 may rotate back down to being flush with the user's back. Wind force abatement device thus reduces the wind forces acting on the user. Wind force abatement device 180 may be a hinge (e.g., a door or cabinet hinge) or a flexible member (e.g., nylon webbing material, rubber, or flexible plastic). In another example, the hinge is created by a strap of nylon webbing material that is looped around handle 101 and secured (e.g., by Velcro) to itself or to harness 120.

In addition to module carriers configured for attaching to a frame of a solar module, various embodiments of the present disclosure are related to module carriers configured for attaching to one or more frameless modules (i.e., a module that does not have a frame around an outer edge of the module). As will be understood, frameless modules may include solar cells sandwiched between two pieces of glass. One example frameless modules is a glass-glass module, which includes glass on a top side of the module and glass on an underside of the module, in addition to (or in place of) a typical polymer backsheet.

According to one embodiment, a carrier device may be configured to secure a module by "pinching" the module. Stated another way, for example, a carrier device may create opposing forces on opposite surfaces of a module (e.g., a top major axis surface and bottom major axis surface). In one embodiment, the carrier device may include a compliant material, such as rubber, configured to contact one or surfaces of the module (e.g., to further increase friction).

Figure 21B:
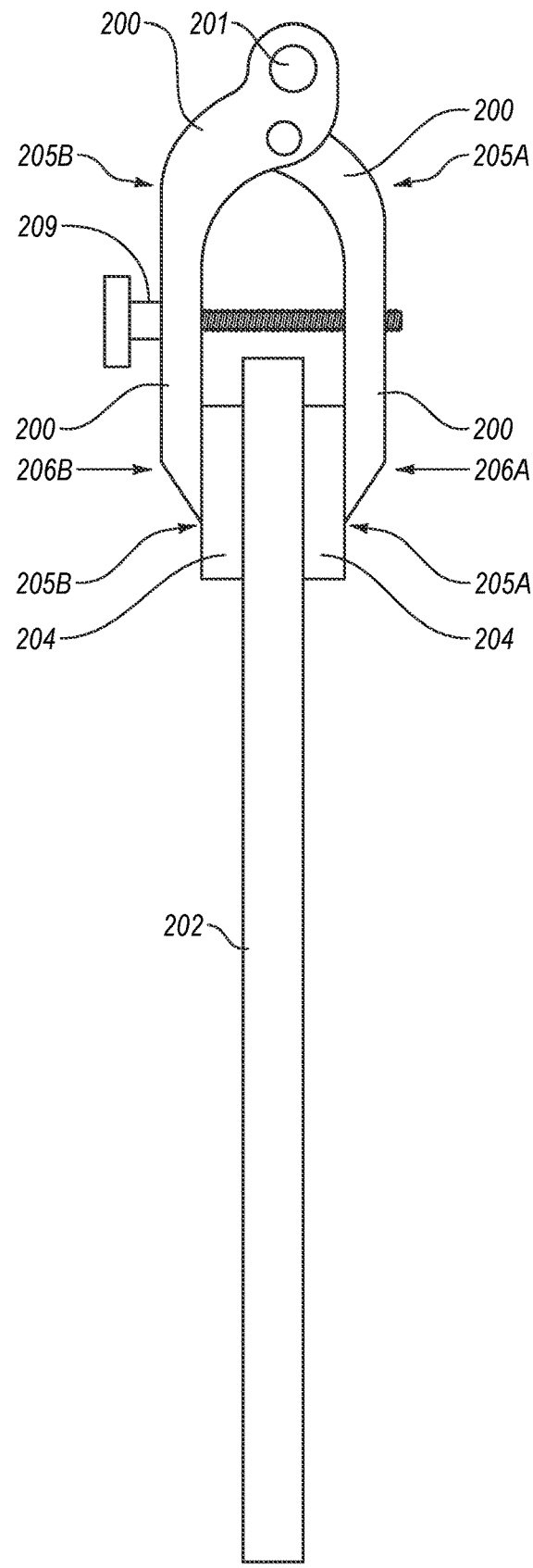

FIGS. 21A and 21B depict a carrier device 200, according to one embodiment of the present disclosure. FIG. 21A is a side view (major-axis view) of carrier device 200, and FIG. 21B is end view (minor-axis view) of carrier device 200. Carrier device 200, which may also be referred to herein as a "clamp," may include a handle 201 and a plurality of arms 205. Carrier device 200 may further include a fastening device 209, such as a bolt, a screw, or the like. Each arm 205 of carrier device 200 may include a compliant material 204 for contacting one or more surfaces of a module 202. As a non-limiting example, compliant material 204 may comprise rubber.

In one example, each arm 205 may be configured to rotate about handle 201. More specifically, one or more arms 205 may be rotated to enable module 202 to be positioned between arms 205. Further, one or more arms 205 may be rotated to "pinch" module 202 (i.e., between two or more arms 205). As will be appreciated, each arm 205 may be configured to apply a pressure against a surface of module 202. More specifically, for example, arm 205A may be configured to apply pressure in a first direction (i.e., as indicated by arrow 206A), and arm 205B may be configured to apply pressure in a second, opposite direction (i.e., as indicated by arrow 206B).

Fastening device 209 may be configured for securing a position of arms 205 relative to one another to maintain an adequate amount of pressure one each surface of module 202. Collectively, arms 205, and possibly fastening device 209, may be referred to herein as an "attachment device."

Figure 22B:
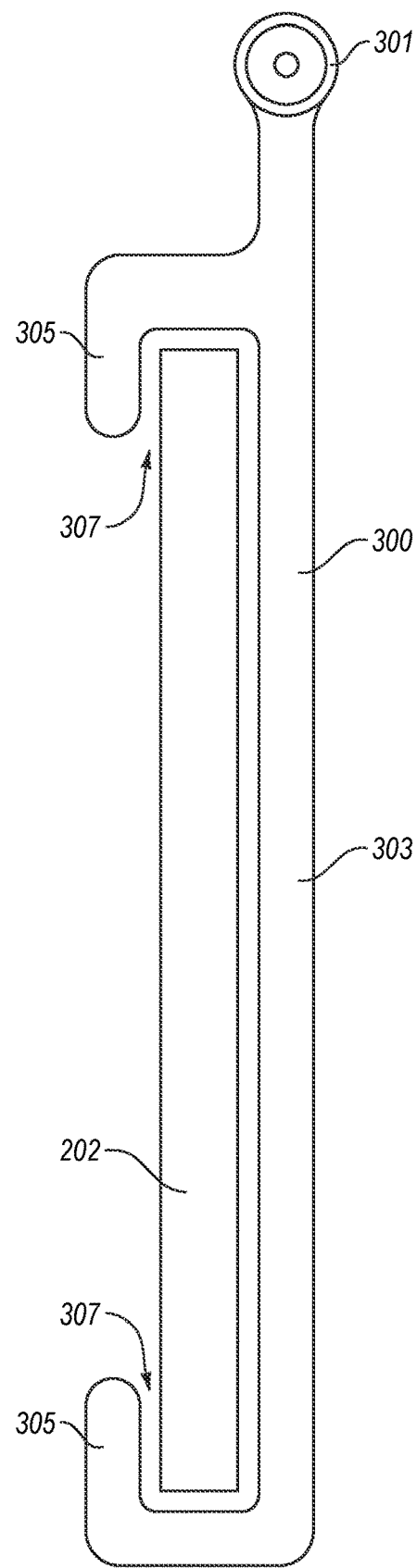

Another carrier device 300 is illustrated in FIGS. 22A and 22B. FIG. 22A is a side view (major-axis view) of another carrier device 300, and FIG. 22B is end view (minor-axis view) of carrier device 300. Carrier device 300 includes a handle 301 and an arm 303 for being secured to module 202 (e.g., a frameless module). Arm 303 may extend from one surface (e.g., a first minor surface) of module 202 to an opposite surface (e.g., a second, opposite minor surface) of module 202. Further, the module carrier may include one or more channels 307 configured to capture at least a portion of an end of module 202. Further, module carrier 300 may include one or more tabs 305 for securing module 202 within channels 307. Module carrier 300 may be configured to provide a lifting force to carry the weight of a solar module.

Figure 23A:
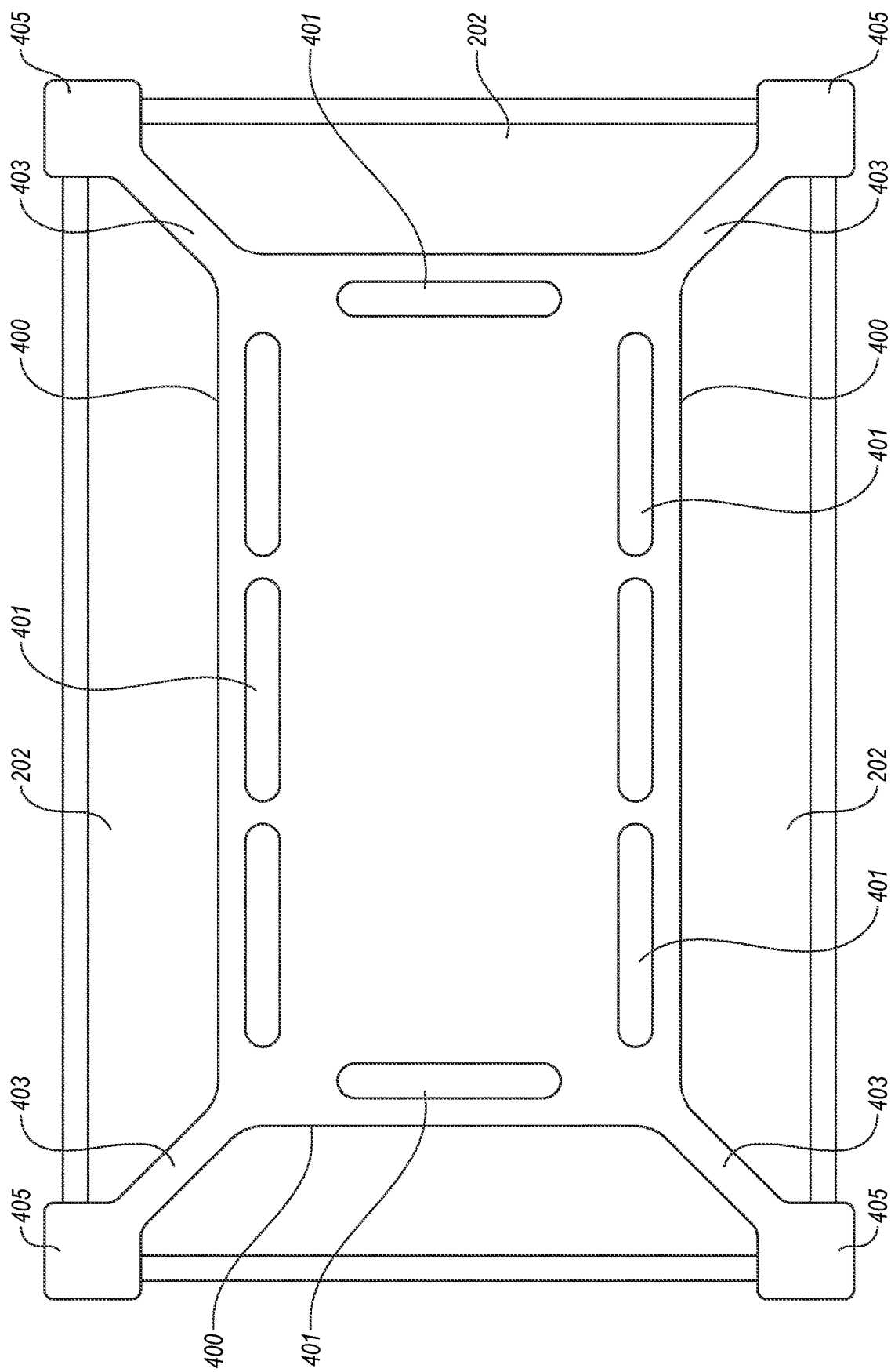
FIGS. 23A and 23B illustrate yet another carrier device, in accordance with an embodiment of the present disclosure.
Figure 23B:
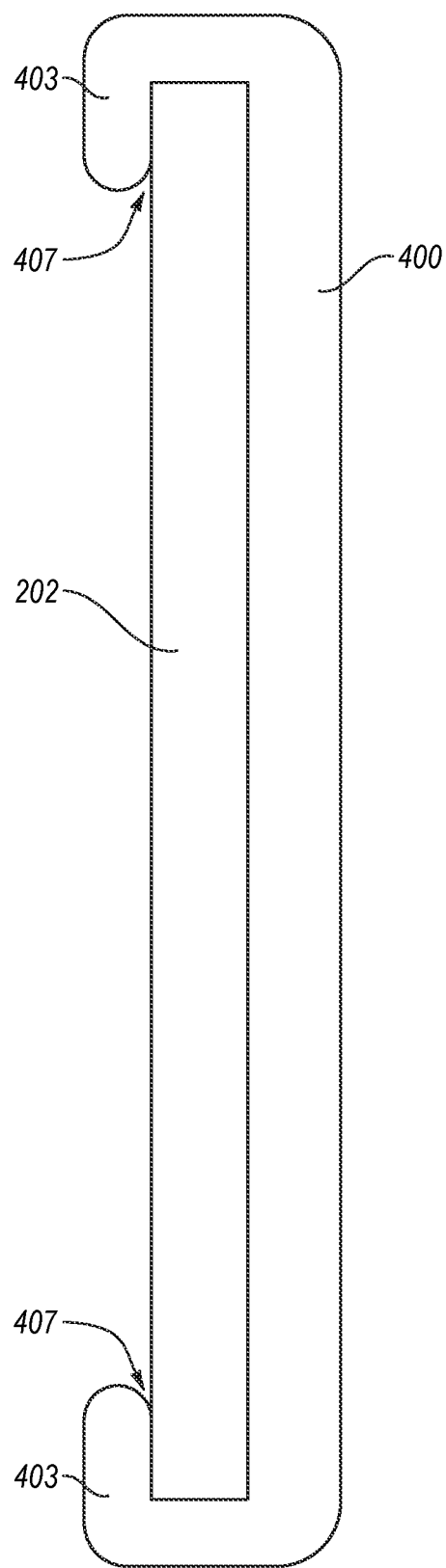

As will be understood by a person having ordinary skill in the art, a frameless module may be susceptible to damage, especially at the corners. Another embodiment includes a carrier device that may provide protection to a module. With reference to FIGS. 23A and 23, a carrier device 400, according to an embodiment of the present disclosure, is illustrated. FIG. 23A is a side view (major-axis view) of carrier device 400, and FIG. 23B is end view (minor-axis view) of carrier device 400. Carrier device 400 includes handle 401, one or more arms 403, and one or more covers 405. Each cover 405 may be configured to at least partially cover a corner of module 202 (e.g., to provide protection for the corner) positioned in a channel 407. It is noted that carrier device 400 may include a plurality of handles 401, which may enable one or more individuals to carry a solar module.

Embodiments of the present disclosure include a relatively low-cost device that may relieve stress, strain, and safety risks associated with carrying solar modules. Further, embodiments of the present disclosure may reduce the labor costs associated with moving solar modules. Further, the embodiments described herein may enable a user to carry a module up a ladder while maintaining three points of contact, as recommend by OSHA.

Although the foregoing description contains many specifics, these should not be construed as limiting the scope of the disclosure or of any of the appended claims, but merely as providing information pertinent to some specific embodiments that may fall within the scopes of the disclosure and the appended claims. Features from different embodiments may be employed in combination. In addition, other embodiments may also be devised which lie within the scopes of the disclosure and the appended claims. The scope of the disclosure is, therefore, indicated and limited only by the appended claims and their legal equivalents. All additions, deletions and modifications to the disclosure, as disclosed herein, that fall within the meaning and scopes of the claims are to be embraced by the claims.

What is claimed is:

1. A solar module carrier device, comprising:
 a handle;
 an attachment device coupled to the handle and configured to couple to a solar module, wherein the attachment device includes a channel configured for receiving a frame of the solar module, wherein a depth of the channel is greater than a width of the channel; and
 an anti-slip device comprising a threaded rod positioned and fixed on an upward-facing edge of the channel and having a rod axis that is parallel to a downward-facing surface of the solar module, the anti-slip device being configured to contact a downward-facing edge of the frame and create an interference laterally along the downward-facing edge to prevent the downward-facing edge from sliding in the channel, the anti-slip device comprising a first metallic material that is stronger than a second material of the frame for deforming at least a portion of the downward-facing edge of the frame.

2. The solar module carrier device of claim 1, wherein the attachment device comprises two attachment devices spaced at least three inches apart.

3. The solar module carrier device of claim 2, wherein the solar module carrier device has a weight of at least four pounds.

4. The solar module carrier device of claim 3, wherein the handle has a width of at least 34 centimeters.

5. The solar module carrier device of claim 1, wherein the handle comprises an attachment point for coupling to a pulley system.

6. The solar module carrier device of claim 1, wherein the anti-slip device is configured to contact and create friction with the downward-facing edge of the frame.

7. The solar module carrier device of claim 1, wherein the anti-slip device comprises the threaded rod for penetrating the downward-facing edge of the frame of the solar module to create a deformation.

8. The solar module carrier device of claim 1, wherein the handle comprises an attachment point for coupling to a rope.

9. A solar module lifting device, comprising:
a handle;
at least one attachment device coupled to the handle and configured to couple to a solar module, the at least one attachment device including:
a vertical channel including an open end for receiving at least a portion of the solar module and a closed end at a bottom of the vertical channel, the closed end opposite the open end; and
an anti-slip device comprising a threaded rod positioned at the bottom of the vertical channel and having a rod axis that is parallel to a downward-facing surface of the solar module, the anti-slip device configured to engage the solar module under the weight of the solar module and penetrate the downward-facing surface of the solar module to limit movement of the at least a portion of the solar module positioned in the vertical channel in at least one of a first horizontal direction and a second, opposite horizontal direction.

10. The solar module lifting device of claim 9, wherein a width of the vertical channel is greater than 2.5 millimeters and less than 4 millimeters.

11. The solar module lifting device of claim 9, wherein the handle comprises an attachment interface for coupling to a rope.

12. The solar module lifting device of claim 9, wherein a nose of the at least one attachment device has a width of 22 millimeters or less.

13. A solar module carrier device, comprising:
an attachment interface;
at least one attachment device coupled to the attachment interface and configured to couple to a solar module, wherein the at least one attachment device includes a vertical channel extending from an opening of the vertical channel away from the attachment interface in a first vertical direction and configured for receiving a portion of a frame of the solar module; and
an anti-slip device comprising a threaded rod positioned within the vertical channel in a fixed position relative to the vertical channel and having a rod axis that is parallel to a downward-facing surface of the solar module, the anti-slip device configured to contact and create friction with a downward-facing edge of the portion of the frame of the solar module;
wherein the attachment interface and the at least one attachment device are configured such that a lifting force applied to the attachment interface while the solar module is being carried is in a second vertical direction opposite the first vertical direction and perpendicular to a horizontal direction.

14. The solar module carrier device of claim 13, wherein the vertical channel has a resting depth of 14 millimeters to 22 millimeters.

15. The solar module carrier device of claim 13, wherein the attachment interface is configured for coupling to a rope or a hook.

16. The solar module carrier device of claim 13, wherein the anti-slip device is configured to limit movement of the portion of the frame of the solar module positioned in the vertical channel in the horizontal direction.

17. The solar module carrier device of claim 13, wherein the attachment interface and the at least one attachment device comprise a single piece of continuous material.

18. A solar module lift system, comprising:
a solar module lifting device including:
a handle;
at least one attachment device coupled to the handle and configured to couple to a solar module, wherein the at least one attachment device includes a channel for receiving a portion of a frame of the solar module; and
an anti-slip device located at a bottom of the channel and configured to penetrate at least a portion of an edge of the frame of the solar module;
a pulley; and
a rope coupled to the pulley and including one end coupled to the solar module lifting device, wherein the rope includes a first section extending from the pulley toward the ground and a second section extending from the pulley to the solar module lifting device.

19. The solar module lift system of claim 18, wherein a weight of the solar module lifting device is greater than a weight of the first section of the rope.

* * * * *